(12) United States Patent  
Ikemoto et al.

(10) Patent No.: US 8,701,809 B2  
(45) Date of Patent: Apr. 22, 2014

(54) VEHICLE CONTROL DEVICE

(75) Inventors: Minoru Ikemoto, Tokyo (JP); Hideo Okayama, Tokyo (JP); Yasuaki Mamoto, Tokyo (JP); Yoshio Nagatsuka, Tokyo (JP); Tetsuya Takahashi, Tokyo (JP); Hidetoshi Sumita, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 444 days.

(21) Appl. No.: 13/120,953

(22) PCT Filed: Oct. 10, 2008

(86) PCT No.: PCT/JP2008/068500  
§ 371 (c)(1),  
(2), (4) Date: Mar. 25, 2011

(87) PCT Pub. No.: WO2010/041339  
PCT Pub. Date: Apr. 15, 2010

(65) Prior Publication Data  
US 2011/0176281 A1   Jul. 21, 2011

(51) Int. Cl.  
*B60K 1/00* (2006.01)

(52) U.S. Cl.  
USPC .................................. 180/65.8; 180/65.265

(58) Field of Classification Search  
USPC ................... 280/65.8, 65.265, 65.235, 65.27, 280/65.285; 323/282, 351  
See application file for complete search history.

(56) References Cited

U.S. PATENT DOCUMENTS

| 2007/0169007 A1 | 7/2007 | Hashimoto et al. |
| 2009/0101419 A1 | 4/2009 | Okayama et al. |
| 2009/0240384 A1 | 9/2009 | Ikemoto et al. |

FOREIGN PATENT DOCUMENTS

| JP | 5-199601 A | 8/1993 |
| JP | 7-017396 A | 1/1995 |
| JP | 10-278784 A | 10/1998 |
| JP | 2001-258236 A | 9/2001 |
| RU | 2 329 170 C2 | 7/2008 |
| WO | WO 2007/138645 A1 | 12/2007 |
| WO | WO 2007/138759 A1 | 12/2007 |
| WO | WO 2007/138760 A1 | 12/2007 |

OTHER PUBLICATIONS

* International Search Report (PCT/ISA/210) issued on Feb. 10, 2009, by Japanese Patent Office as the International Searching Authority for International Application No. PCT/JP2008/068500.  
Office Action from Chinese Patent Office dated Jan. 14, 2013, issued in corresponding Chinese Patent Appln. No. 2008801314757, with English translation thereof (13 pages).  
Office Action (Decision on Grant Paten for Invention) dated Aug. 6, 2012, issued in corresponding Russian Patent Application No. 2011118380, and a partial English Translation thereof. (14 pages).

*Primary Examiner* — Hau Phan  
(74) *Attorney, Agent, or Firm* — Buchanan Ingersoll & Rooney PC

(57) ABSTRACT

A vehicle control device includes plural functional modules each of which is a minimum part unit that contributes to change in input/output potentials, and has an input and an output of one power line or one set of power lines, except for power lines having a same potential as that on an overhead wire side or that on a ground side. The functional module has an interface surface on one side surface, to which both of a signal line and the power line are connected. Each interface surface is divided into a first interface area in which a signal line terminal connected to the signal line is placed, and a second interface area in which a power line terminal connected to the power line is placed. The plural functional modules are adjacently arranged such that the interface surfaces face in a same direction, the first interface areas are located on one end side in common, and the second interface areas are located on the other end side in common.

20 Claims, 32 Drawing Sheets

VEHICLE CONTROL DEVICE

TECHNICAL FIELD

The present invention relates to a vehicle control device that is in, for example, a box shape and is equipped underneath a floor or on a roof of a vehicle to supply power to devices and the like of the vehicle.

BACKGROUND ART

Devices equipped underneath a floor in a box shape are disclosed in, for example, Patent Documents 1 and 3. A device equipped on a roof in a box shape is disclosed in, for example, Patent Document 2.

Patent Document 1: Japanese Patent Application Laid-open No. 2001-258236 (FIG. 3)
Patent Document 2: Japanese Patent Application Laid-open No. H07-17396 (FIG. 3)
Patent Document 3: Japanese Patent Application Laid-open No. H05-199601 (FIGS. 1 and 2)

DISCLOSURE OF INVENTION

Problem to be Solved by the Invention

In background art of Patent Document 1, arrangement of main parts housed in a casing is described; however, there are few descriptions on an arrangement relation between signal lines and power lines electrically connected. Practically, signal lines and power lines that connect parts with each other normally run all over. Accordingly, an operation for attaching or detaching the parts to or from the casing cannot be readily performed, and maintenance and inspection is not easy. Because the signal lines and the power lines run all over, an electro-magnetic noise path caused by semiconductor switches is complicated and therefore selection of parts for electro-magnetic compatibility (EMC) is difficult.

Patent Document 3, which has overcome these problems in some degrees, discloses a vehicle control device in which signal lines and power lines are separately arranged. In Patent document 3, an upper casing and a lower casing are attached underneath a floor of a vehicle through a bracket, and the lower casing houses an internal device unit that is a main part of the control device. Inspection covers are provided in an openable and closable manner on one side surface and the other side surface of the lower casing, respectively. A power line connected to one side surface of the internal device unit is drawn to the upper casing. A signal line connected to the other side surface of the internal device unit is drawn to the upper casing. The power line and the signal line are separately arranged in the upper casing. Also in this vehicle control device of Patent Document 3, when the internal device unit is to be attached thereto or detached therefrom, operations not only from the one side but also from the other side are needed, which prevents easy attachment, detachment, maintenance, or inspection. It takes time and causes a problem particularly when emergency repair is required. Because the power line is arranged on the one side surface and the signal line is arranged on the other side surface, attachment or detachment of the internal device unit is performed from a bottom surface of the casing with lower workability. Therefore, the operation to attach or detach the internal device unit is not easy.

The present invention has been made in view of the above problems, and an object of the invention is to provide a vehicle control device that can facilitate an operation to assemble or detach the device and streamline a maintenance or inspection operation for keeping performance of the device over years.

Means for Solving Problem

To solve the problem described above and achieve the object, a vehicle control device according to the present invention includes: a plurality of functional modules each of which is a minimum part unit that contributes to change in input/output potentials and capable of including a part that does not contribute to change in input/output potentials; and signal lines and power lines that connect the functional modules, wherein the functional modules have interface surfaces on one side surfaces thereof, to which both of the signal lines and the power lines are connected, each of the interface surfaces is divided into a first interface area in which a signal line terminal connected to the signal line is placed, and a second interface area in which a power line terminal connected to the power line is placed, and the plural functional modules are adjacently arranged such that the interface surfaces face in a same direction, the first interface areas are located on one end side in common, and the second interface areas are located on the other end side in common.

Effect of the Invention

A vehicle control device according to the present invention includes a plurality of functional modules each of which is a minimum part unit that contributes to change in input/output potentials and capable of including a part that does not contribute to change in input/output potentials, and signal lines and power lines that connect the functional modules, in which the functional modules have interface surfaces on one side surfaces thereof, to which both of the signal line and the power line are connected, each of the interface surfaces is divided into a first interface area in which a signal line terminal connected to the signal line is placed, and a second interface area in which a power line terminal connected to the power line is placed, the functional modules are adjacently arranged such that the interface surfaces face in a same direction, the first interface areas are located on one end side in common, and the second interface areas are located on the other end side in common. Therefore, a wiring path is simplified, a wiring operation is simplified, an operation to assemble or detach the device is simplified, and a maintenance or inspection operation for keeping performance of the device over the years is streamlined.

EXPLANATIONS OF LETTERS OR NUMERALS

Figure 1:
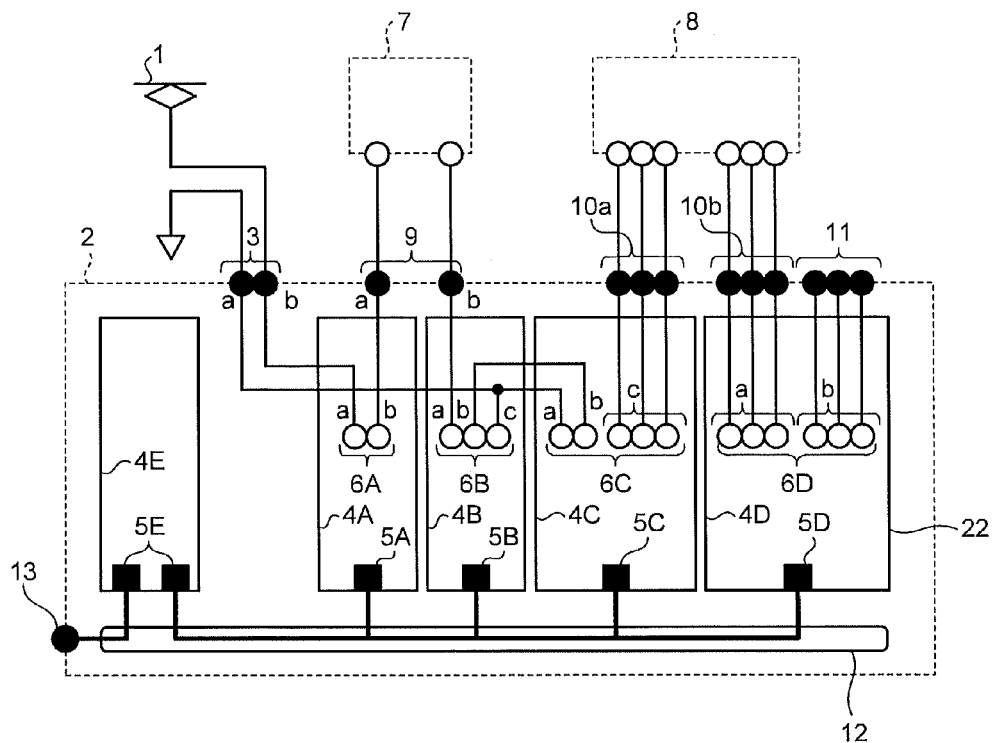
FIG. 1 is a block diagram of an example of a vehicle control device according to a first embodiment of the present invention.

1 Overhead wire
2 Vehicle-control device body
3, 13 Input terminal group
4A to 4E Functional module
5 First interface area
6 Second interface area
7 Reactor
9, 10a, 10b Terminal group
8 Transformer (insulating transformer)
11 Output terminal group
12 Line-bundle housing unit (wiring duct)
14 Switch
15 Reverse-blocking semiconductor switch
16 Charge resistor 16
17 Discharge switch
18 Discharge resistor
19 Capacitor
20 Switching circuit
21 Contactor
22 Interface surface
4N, 4T, 4U, 4V, 4W Module
32 Switch
33 Charge contactor
34 Charge resistor
35 Current sensor
36 Voltage sensor
37 Differential current sensor
38 Ground switch
39 Switching circuit
40 Voltage sensor
41 Core
42 Capacitor
43 Discharge resistor
44 Switching unit
45 Resistor
46 Voltage sensor
53 Transformer
54 Switch
55, 66 Switching circuit
56, 57 Capacitor
58, 59 Resistor
60, 61 Voltage sensor
130 Vehicle
131 Upper casing
132 Lower casing
133 Internal device unit
134, 135 Inspection cover
137 Power line
138 Signal line connector
139 Signal line
140 Hanging leg
352 Frame
353, 354 Bolt
356 Cooling fin
357 Inspection cover

BEST MODE(S) FOR CARRYING OUT THE INVENTION

First Embodiment

A first embodiment of the present invention will be explained with reference to FIGS. 1 to 8. FIG. 1 is a block diagram of an example of a vehicle control device according to the first embodiment. FIG. 1 also depicts division of the device into several functional modules. A configuration shown in FIG. 1 is explained first. As shown in FIG. 1, a vehicle-control device body 2 is connected to an overhead wire 1 (on a side of the overhead wire and on a side of the ground) through an input terminal group 3. The vehicle-control device body 2 includes functional modules 4A to 4E, and all the functional modules 4A to 4E include first interface areas 5A to 5E in which a group of signal line terminals is concentrated, respectively. The functional modules 4A to 4D except for the functional module 4E include second interface areas 6A to 6D in which a group of power line terminals is concentrated, respectively. Some of the terminals are denoted by reference letters a, b, and c.

A reactor 7 is placed outside the vehicle-control device body 2. The reactor 7 is connected to the vehicle-control device body 2 through a terminal group 9. A transformer (insulating transformer) 8 is placed outside the vehicle-control device body 2. The transformer (insulating transformer) 8 is connected to the vehicle-control device body 2 through terminal groups 10a and 10b. The vehicle-control device body 2 includes an output terminal group 11. A line-bundle housing unit (wiring duct) 12 that houses a bundle of signal lines is placed inside the vehicle-control device body 2. The vehicle-control device body 2 also includes a control input-terminal group 13 for transmitting or receiving information to or from a controller (not shown) that performs superior control of the vehicle control device.

Main functions of the functional modules are explained. The functional module 4A is an opening/closing circuit that has a function to perform electrical connection to or disconnection from the overhead wire 1 (a DC power supply, in this example). The functional module 4B has a function to charge or discharge a DC voltage, and has a space in which a device (a core, for example) that can suppress electro-magnetic noise can be placed as necessary. The functional module 4C has a function to convert a DC voltage into an AC voltage. The functional module 4D has a function to electrically connect to or disconnect from a load connected to the output terminal group 11, and has a space in which a device (a core, for example) that can suppress electro-magnetic noise can be placed as necessary. Normally, the load includes a vehicle lighting apparatus, an air conditioner, and the like. The functional module 4E is a control circuit that has a control substrate and a relay circuit as components to control the whole vehicle control device according to a signal transmitted from the superior controller through the control input-terminal group 13. The vehicle control device is used as an auxiliary power-supply device, for example.

Figure 2:
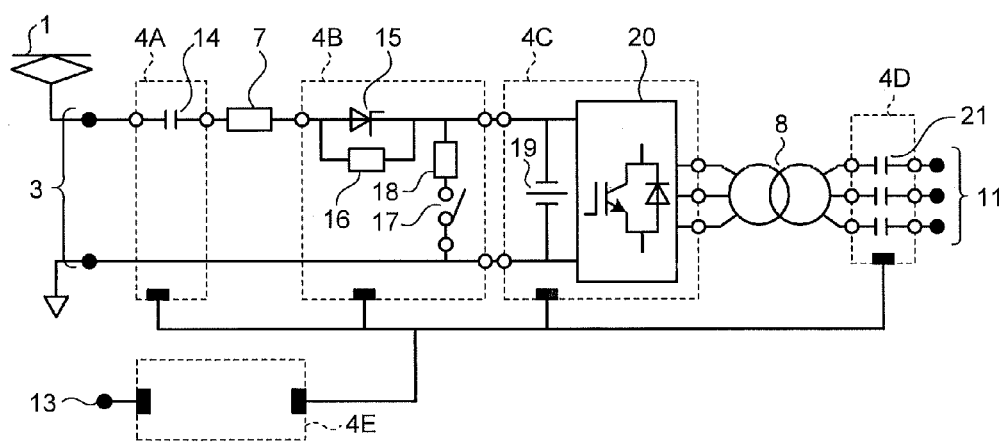
FIG. 2 is a circuit configuration diagram of a specific example of FIG. 1.

FIG. 2 is a circuit configuration diagram of the vehicle control device shown in FIG. 1. An example of division of the functional modules 4A to 4E according to functional definitions is also shown. Main parts as components for the respective functional modules 4 are explained. A switch 14 is a main part for the functional module 4A. The functional module 4B is a charging/discharging circuit, and has a reverse-blocking semiconductor switch 15, a charge resistor 16, a discharge switch 17, and a discharge resistor 18. The functional module 4C is an inverter, and has a capacitor 19 and a switching circuit 20. The functional module 4D is a contactor 21, and opens or closes power supply to the load. A voltage sensor, a current sensor, and the like are not shown in FIG. 2.

Characteristics of the functional modules 4A to 4D are explained. Each of the functional modules 4A to 4D is a minimum part unit that contributes to change in input/output potentials. "Part unit that contributes to change in input/output potentials" indicates a part unit that makes an output potential different from an input potential due to an operation thereof, and a "minimum part unit" indicates a minimum part unit among these part units that cannot be further divided into plural "part units that contribute to change in input/output potentials". Therefore, the functional modules 4A to 4D according to the present embodiment each include only one minimum part that contributes to change in the input/output potentials. The functional modules 4A to 4D, however, can include an arbitrary number of parts that do not contribute to change in input/output potentials. Division into the functional modules 4A to 4D is performed so that each of the functional modules 4A to 4D becomes a minimum part unit that contributes to change in the input/output potentials.

For example, the functional module 4A includes the switch 14, and has a function as a minimum part unit that contributes to change in the input/output potentials due to the switch 14. That is, because the input potential and the output potential are made different by cutting on or off the switch 14, the functional module 4A includes a part that contributes to change in the input/output potentials and does not include another part that contributes to change in the input/output potentials. Therefore, the functional module 4A is a minimum part unit.

The functional module 4B includes the reverse-blocking semiconductor switch 15, the charge resistor 16, the discharge switch 17, and the discharge resistor 18. Among these, a set of the reverse-blocking semiconductor switch 15 and the charge resistor 16 has a function as a minimum part that contributes to change in the input/output potentials. A set of the discharge switch 17 and the discharge resistor 18 is a part that does not contribute to change in the input/output potentials. That is, regarding the part composed of the set of the discharge switch 17 and the discharge resistor 18, there is no change in potential differences between two terminals on the input side and two terminals on the output side. Accordingly, this part does not contribute to change in the input/output potentials. The functional module 4B includes a minimum part that is composed of the set of the reverse-blocking semiconductor switch 15 and the charge resistor 16 and contributes to change in the input/output potentials, and also includes the part that is composed of the set of the discharge switch 17 and the discharge resistor 18 and does not contribute to change in the input/output potentials. Therefore, the functional module 4B is a minimum part unit that contributes to change in the input/output potentials.

The functional module 4C includes the capacitor 19 and the switching circuit 20. The switching circuit 20 has a function as a minimum part that contributes to change in the input/output potentials. On the other hand, the capacitor 19 does not contribute to change in the input/output potentials. That is, in the capacitor 19, there is no change in potential differences between two terminals on the input side and two terminals on the output side. Therefore, the functional module 4C is a minimum part unit that contributes to change in the input/output potentials.

The functional module 4D includes the contactor 21, and functions as a minimum part unit that contributes to change in the input/output potentials by opening or closing of power supply to the load.

As will be described later, with the functional modules 4A to 4D thus configured, when one function is to be added/eliminated for example, only the function can be added/eliminated independently because the functional modules do not interfere with each other, which reduces time required for design and production. Even when a problem occurs, inspection and replacement can be performed in a short time, and the device can be restored promptly.

As described above, when the functional modules 4A to 4E are divided according to the functional definitions, devices that mainly produce electro-magnetic noise, that is, the inverter is concentrated in the functional module 4C, and a noise filtering function can be provided to the functional modules 4B and 4D as necessary. When the functional modules 4 are arranged as shown in FIGS. 1 and 2 and a second interface area 6 of one of the functional modules 4 and the second interface area 6 of another functional module 4 are connected with power lines, the functional modules 4 can be designed such that the number of power lines or sets of power lines (three-phase AC, for example) that connect these functional modules 4 other than power lines having the same potential as that on the overhead wire side or that on the ground side is only one as for DC, or only one set as for poly-phase AC. That is, the functional modules 4 can be designed such that each of the functional modules 4 has an input of a single line or a single set of lines and an output of a single line or a single set of lines.

The foregoing is explained with reference to FIG. 1. The functional modules have power lines having the same potential as that on the overhead wire side or that on the ground side: a power line from a terminal 3b on the overhead wire side to a terminal 6Aa, a power line from a terminal 3a on the ground side to a terminal 6Bc, and a power line from the terminal 3a on the ground side to a terminal 6Ca. Except for these power lines, each functional module has an input of a single line or a single set of lines and an output of a single line or a single set of lines. That is, the functional module 4B has a power line from a terminal 9b to a terminal 6Ba on the input side and a power line from a terminal 6Bb to a terminal 6Cb on the output side. The functional module 4C has a power line from the terminal 6Bb to the terminal 6Cb on the input side and power lines from terminals 6Cc to the terminals 10a on the output side. The functional module 4D has power lines from the terminals 10b to terminals 6Da on the input side and power lines from terminals 6Db to the terminals 11 on the output side.

According to the first embodiment, the plural functional modules are connected in the following order: the functional module as the opening/closing circuit, the functional module as the charging/discharging circuit, the functional module as the inverter, and the functional module as the contactor. Thus, each of the functional modules 4B, 4C, and 4D is adapted to have an input of a single line or a single set of lines and an output of a single line or a single set of lines. Accordingly, electricity inputted through the overhead wire 1 flows in one direction through the functional modules arranged in the vehicle-auxiliary power-supply device until the electricity is outputted from the vehicle-auxiliary power-supply device. Therefore, a wiring path of the power lines between the functional modules can be shortened. When a problem occurs in a function of the vehicle control device, the functional modules 4 that have to be inspected or replaced can be limited to certain ones. Accordingly, the inspection or replacement can be performed easily in a short time and the device can be restored promptly.

The functional module 4C having the inverter as a main generation source of the electro-magnetic noise is connected only to the functional module 4B and to the functional module 4D through the transformer 8, and is not connected to the other functional modules. Therefore, the auxiliary power-supply device can focus the noise generation source on one module, effectively suppress the electro-magnetic noise, and easily identify a noise generation location. Accordingly, measures for EMC can be effectively taken. When the functional module 4E as the control circuit is connected as shown in FIG. 1, the functional module 4E can be kept away from the functional module 4C that generates the electro-magnetic noise.

As described above, the vehicle control device used as the auxiliary power-supply device is divided into the functional module having the opening/closing circuit, the functional module having the charging/discharging circuit, the functional module having the inverter, and the functional module having the contactor, which are plural functional modules being the minimum part units that contribute to change in the input/output potentials, respectively. Therefore, the functional modules do not interfere with each other, and the maintenance and inspection can be separated for each function and performed promptly. Further, because the devices that mainly generate the electro-magnetic noise are concentrated in the functional module having the inverter, measures against noise can be easily taken.

Figure 3:
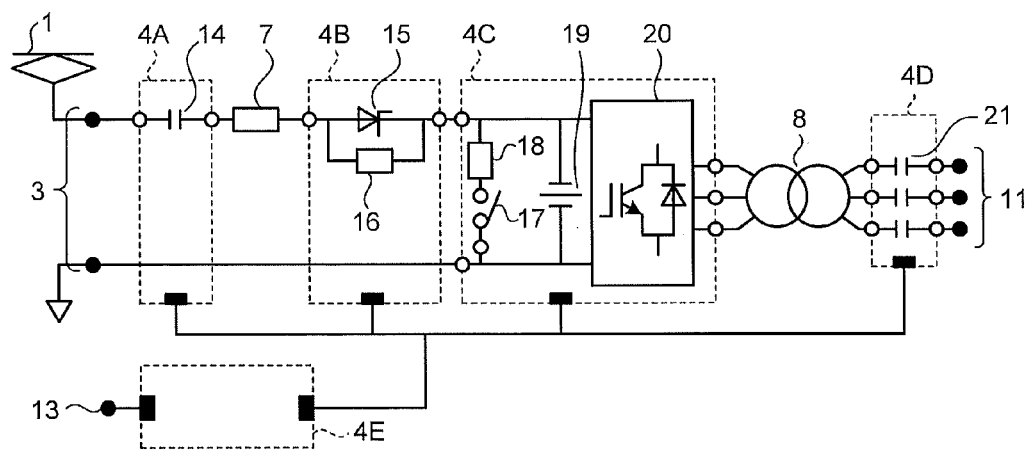
FIG. 3 is another configuration example of functional modules 4A to 4D shown in a circuit configuration diagram.
Figure 4:
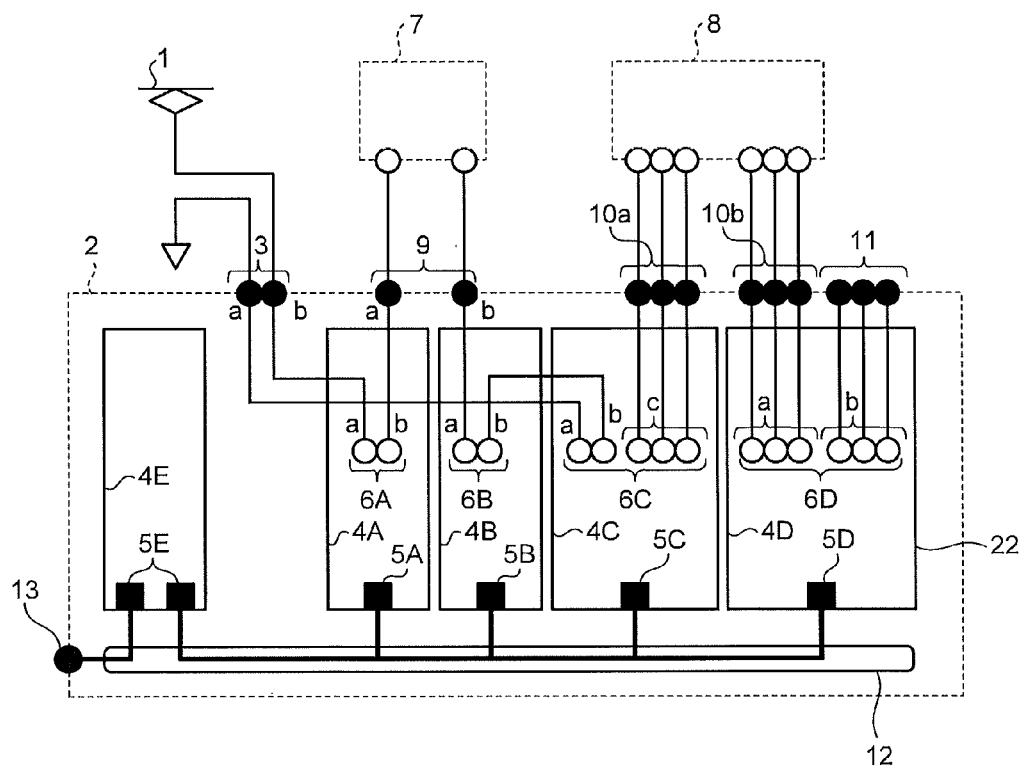
FIG. 4 is a block diagram of a vehicle control device corresponding to FIG. 3.

FIG. 3 is another configuration example of the functional modules 4A to 4D shown in a circuit configuration diagram. FIG. 4 is a block diagram of a vehicle control device corresponding to FIG. 3. As shown in FIG. 3, while the circuit configuration is the same as that shown in FIG. 2, configurations of the functional modules 4B and 4C are different from those in FIG. 2. That is, in FIG. 3, the functional module 4B includes the reverse-blocking semiconductor switch 15 and the charge resistor 16, a set of which functions as a minimum part unit that contributes to change in the input/output potentials, and does not include other parts. In FIG. 3, the functional module 4C includes the discharge switch 17, the discharge resistor 18, the capacitor 19, and the switching circuit 20. Among these components, the switching circuit 20 has a function as a minimum part that contributes to change in the input/output potentials. Meanwhile, the discharge switch 17, the discharge resistor 18, and the capacitor 19 are parts that do not contribute to change in the input/output potentials.

When the functional modules 4B and 4C are configured as shown in FIG. 3, the number of terminals is reduced as compared to FIG. 1 as shown in FIG. 4, and the number of parts and operation man-hours are reduced. Specifically, while the functional module 4B has two terminals in FIG. 4, it has three terminals in FIG. 1.

Also in FIG. 4, regarding power lines that connect the respective functional modules 4 other than power lines having the same potential as that on the overhead wire side or that on the ground side, the functional modules can be configured to have an input of a single line or a single set of lines, and an output of a single line or a single set of lines. For example, the functional module 4B has an input of a single power line from the terminal 9b to the terminal 6Ba on the input side, and an output of a single power line from the terminal 6Bb to the terminal 6Cb on the output side. The other functional modules 4 can be explained in the same manner as in the example shown in FIG. 1.

Therefore, also in the configuration shown in FIGS. 3 and 4, a wiring path of the power lines between the functional modules 4A to 4D can be shortened. When a problem occurs in a function of the vehicle control device, the functional modules or modules that have to be inspected or replaced can be limited to certain ones. Thus, the inspection or replacement can be easily performed in a short time, and the device can be restored promptly. When the parts that do not contribute to change in the input/output potentials included in the respective functional modules 4 are adjusted as shown in FIGS. 3 and 4, the number of terminals can be reduced, and the number of parts and the operation man-hours can be reduced.

Figure 5:
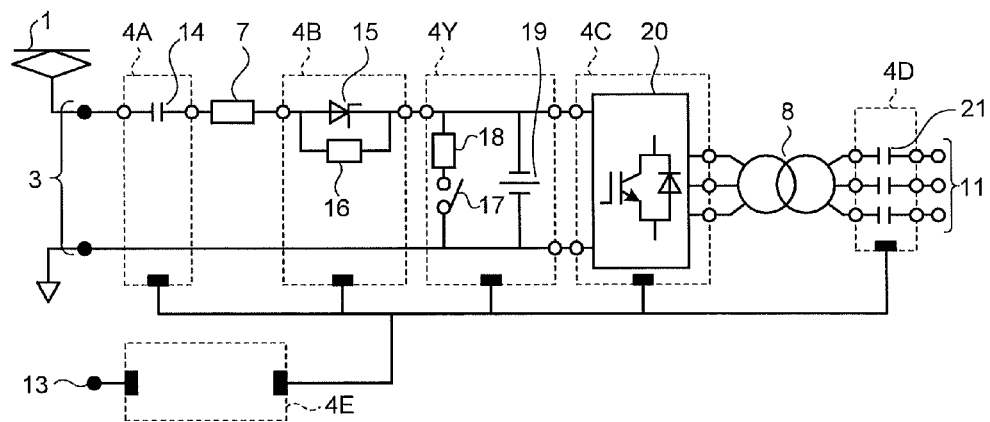
FIG. 5 is a module configuration example with the functional modules 4A to 4D and a module 4Y different from the functional modules, shown in a circuit configuration diagram.
Figure 6:
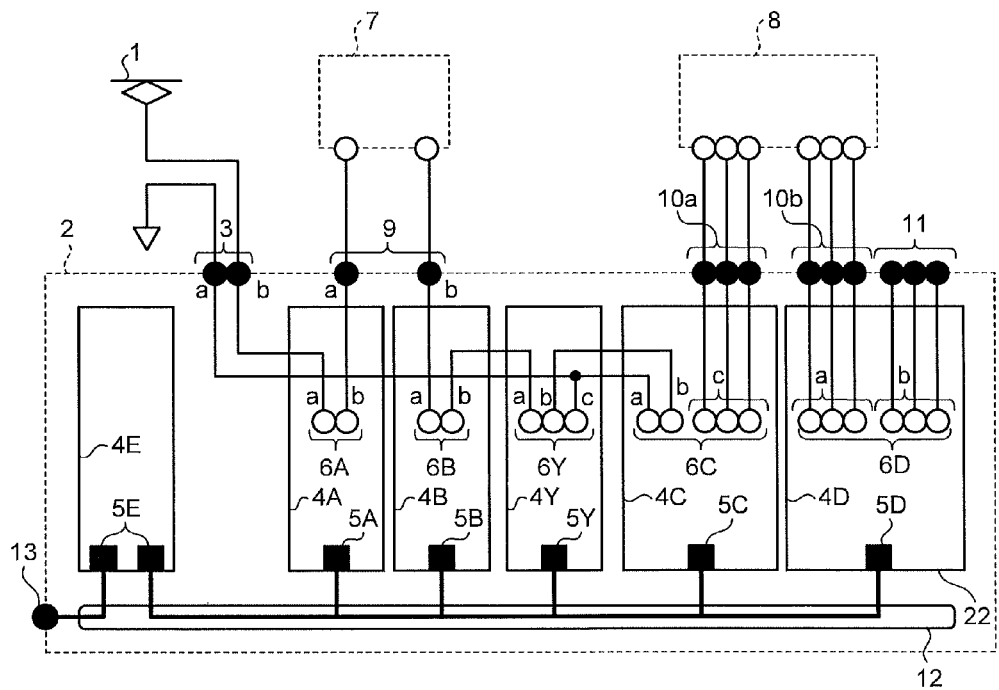
FIG. 6 is a block diagram of a vehicle control device corresponding to FIG. 5.

FIG. 5 is a module configuration example with the functional modules 4A to 4D and a module 4Y different from the functional modules, shown in a circuit configuration diagram. FIG. 6 is a block diagram of a vehicle control device corresponding to FIG. 5. As shown in FIG. 5, while the circuit configuration is the same as those shown in FIGS. 2 and 3, the functional module 4C has a configuration different from that shown in FIG. 3, and the module 4Y different from the functional modules is further included. That is, the functional module 4C includes only the switching circuit 20 and has a function as a minimum part that contributes to change in the input/output potentials. Meanwhile, the module 4Y includes the discharge switch 17, the discharge resistor 18, and the capacitor 19, which are parts that do not contribute to change in the input/output potentials. The functional modules in the present embodiment have a single power line or a single set of power lines for inputting or outputting, and are minimum part units that contribute to change in the input/output potentials. Therefore, the module 4Y is different from the functional modules and includes only parts that do not contribute to change in the input/output potentials.

As shown in FIG. 6, the numbers of terminals in the functional modules 4A to 4D are the same as those in FIG. 4. However, because the module 4Y is provided, the number of modules is increased.

Also in FIG. 6, regarding power lines that connect the functional modules 4A to 4D and the module 4Y with each other, other than power lines having the same potential as that on the overhead wire side or that on the ground side, the functional modules and the module have an input of a single line or a single set of lines and an output of a single line or a single set of lines. Specifically, regarding power lines other than the power lines having the same potential as that on the overhead wire side or that on the ground side, that is, other than power lines from the terminal 3b on the overhead wire side to the terminal 6Aa, from the terminal 3a on the ground side to a terminal 6Yc, and from the terminal 3a on the ground side to the terminal 6Ca, the functional modules 4A to 4D and the module 4Y have an input of a single line or a single set of lines and an output of a single line or a single set of lines. That is, the functional module 4B has a power line from the terminal 9b to the terminal 6Ba on the input side and a power line from the terminal 6Bb to a terminal 6Ya on the output side, the module 4Y has a power line from the terminal 6Bb to a terminal 6Ya on the input side and a power line from the terminal 6Yb to the terminal 6Cb on the output side, the functional module 4C has a power line from the terminal 6Yb to the terminal 6Cb on the input side and power lines from the terminals 6Cc to the terminals 10a on the output side, and the functional module 4D has power lines from the terminals 10b to the terminals 6Da on the input side and power lines from the terminals 6Db to the terminals 11 on the output side.

Therefore, also in the configuration shown in FIGS. 5 and 6, a wiring path of the power lines between the functional modules 4A to 4D and the module 4Y can be shortened. When a problem occurs in a function in the vehicle control device, the functional modules or the module that have to be inspected or replaced can be limited to certain ones. Thus, the inspection or replacement can be performed easily in a short time, and the device can be restored promptly.

In FIGS. 1 to 6, the vehicle-control device body 2 is configured to include the plural functional modules 4A to 4D each being a minimum part unit that contributes to change in the input/output potentials and having a single power line or a single set of power lines for inputting and outputting, and the parts that do not contribute to change in the input/output potentials are included in the functional modules 4A to 4D or provided as the independent module 4Y. Functional modules, which include plural minimum part units that contribute to change in the input/output potentials, do not correspond to those according to the present embodiment. This is because a minimum part unit can address various design changes and maintenances more rapidly. That is, by defining the functional modules at least as the minimum part units that contribute to change in the input/output potentials, when one function (that is, a minimum part unit that contributes to change in the input/output potentials) is to be added/eliminated, for example, only this function can be added/eliminated independently. Accordingly, time required for design and production can be reduced. In contrast, the parts that do not change the input/output potentials can be included in any functional modules or provided separately, which is a matter of design variation. However, from the view point of reducing the total number of modules, it is desirable that the part units that do not contribute to change in the input/output potentials not be an independent module but included in the functional modules.

To sum up, in the present embodiment, the vehicle-control device body 2 is divided into the plural functional modules each having an independent "function", and each functional module is configured to have an input of a single line or a single set of lines and an output of a single line or a single set of lines (except for the power lines having the same potential as that on the overhead wire side or that on the ground side). Each "function" indicates an operation that changes the input/output potentials, and therefore the function modules each have a function as a minimum part unit that changes the input/output potentials. Effects of the present embodiment can be obtained by dividing the vehicle-control device body 2 into the minimum independent functional modules in this way.

Figure 7:
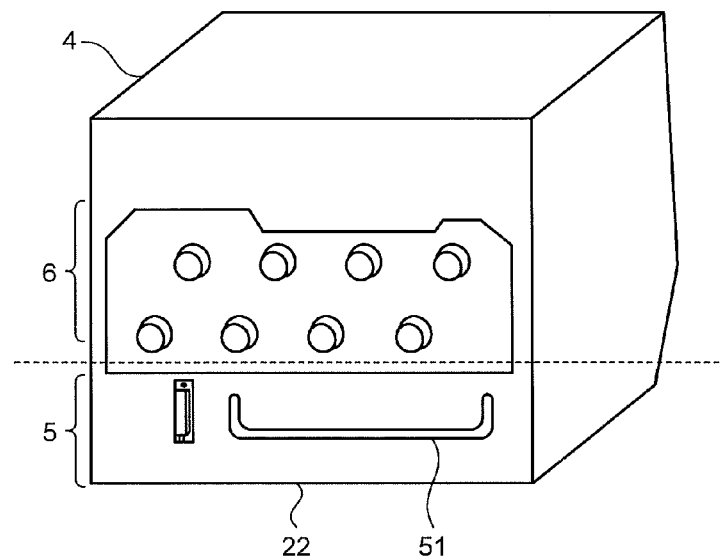
FIG. 7 is a perspective view of an example of an interface surface of a functional module according to the first embodiment.

FIG. 7 depicts an interface surface 22 having the first interface area 5 and the second interface area 6 of one functional module 4 in the same plane. While the configuration shown in FIGS. 1 and 2 will be explained as an example below, the same holds for the configurations shown in FIGS. 3 to 6. A group of signal line terminals is concentrated in the first interface area 5, and a group of power line terminals is concentrated in the second interface area 6. A bundle 51 of signal lines, which are lines in the functional module 4, is placed in the first interface area 5. The first interface area 5 and the second interface area 6 are physically separated into upper and lower sections by a dotted line as shown in FIG. 7. In FIG. 7, the first interface area 5 is located on a lower end side and the second interface area 6 is located on an upper end side. While the vertical relation therebetween can be reversed, vertical relations in all functional modules 4 (except for functional modules 4E, 4I, and 4J, the functional modules 4I and 4I will be explained later) need to be the same. All functional modules applied to the first embodiment (except for the functional module 4E) are designed based on design rules previously standardized as shown in FIG. 7.

That is, according to the design rules previously standardized in the first embodiment, each of the functional modules having the signal line terminals and the power line terminals has an interface surface on one side, which is divided into the first interface area 5 in which the signal line terminals are concentrated and the second interface area 6 in which the power line terminals are concentrated. In addition, on the respective interface surfaces of all the functional modules, the first interface area 5 is located on one end side and the second interface area 6 is located on the other end side in common. This is referred to here as pre-arrangement design for wiring.

In each functional module, the first interface area 5 and the second interface area 6 do not always need to be in the same plane. For example, while the first interface area 5 and the second interface area 6 are both on one side surface of the functional module, one of the areas can be concave, that is, the first interface area 5 and the second interface area 6 can have a difference in levels. The point is that the interface surface having the first and second interface areas is a plane located on one side of the functional module.

Among the functional modules, the interface surfaces do not always need to be in the same plane. However, most suitable arrangement of the interface areas is obtained in a case where the first interface areas 5 of the functional modules are in the same plane, and the second interface areas 6 of the functional modules are in the same plane. In this case, a wiring path is most simplified, and power lines with low costs and light weights can be used because of reduction in wiring length and simplification in processing of the power lines.

Interfaces inside the functional modules 4 are explained next. While an internal interface of the functional module 4C in FIGS. 1 and 2 is explained as an example, the same holds for the other functional modules. The functional module 4C has the capacitor 19 and the switching circuit 20. To enable to divide the functional module 4C into a switching circuit unit (not shown) that includes the switching circuit 20 and a housing unit (not shown) that houses the capacitor 19 and the like, a third interface area is provided in each of the switching circuit unit and the housing unit. That is, the switching circuit unit and the housing unit are coupled or separated through the third interface (not shown) provided in the switching circuit unit and the third interface (not shown) provided in the housing unit. When the third interfaces are provided inside the functional module to enable to subdivide the functional module in this way, flexibility in specification change or the like can be increased. In the above example, two switching circuit units having different shapes can be also coupled to or separated from a common housing unit through the third interfaces. Further, because the number of the capacitors 19 to be housed in the housing unit can be changed, combination of the switching circuit unit and the housing unit can be freely and easily realized based on design specifications. With this internal configuration, the functional module 4C including only the switching circuit 20 (see FIG. 5, in the case where no part that does not contribute to change in the input/output potentials is included) can be easily obtained from the above-mentioned functional module 4C.

Figure 8:
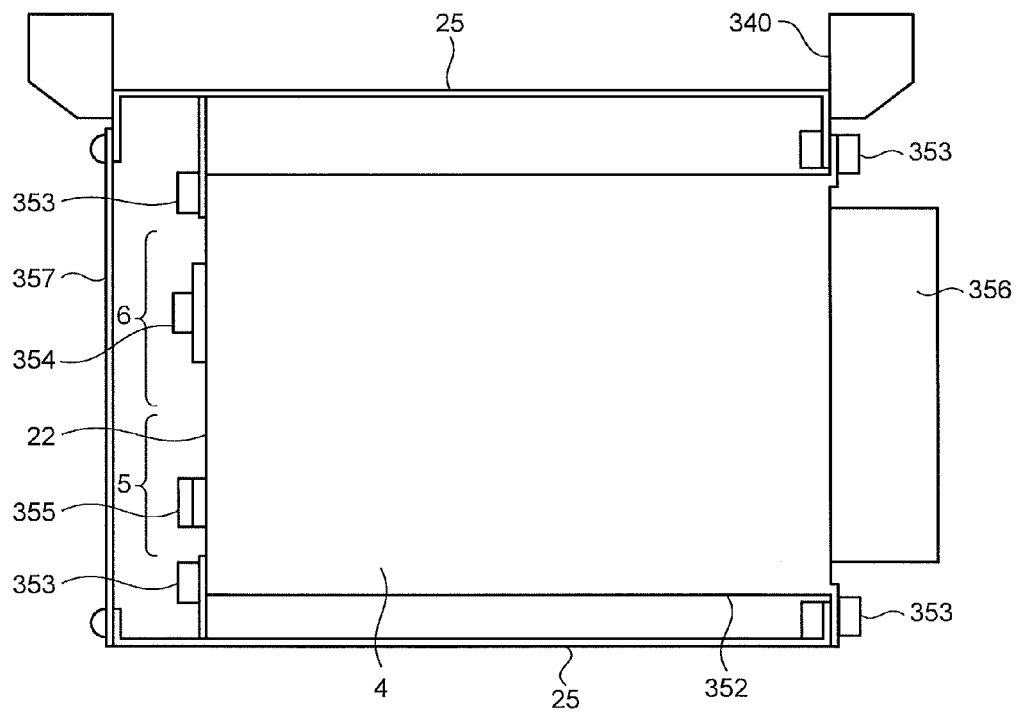
FIG. 8 is a cross-sectional view of an example of the vehicle control device according to the first embodiment.

FIG. 8 is a cross-sectional view of an example of the vehicle control device according to the first embodiment. FIG. 8 is a cross-sectional view of a vehicle control device in which the interface surfaces 22 of the functional modules 4 are adjacently arranged to face in the same direction, the first interface areas 5 are located on one end side (on the lower end side in FIG. 8) in common, and the second interface areas 6 are located on the other end side (on the upper end side in FIG. 8) in common. This example is a desirable mode in which the interface surfaces 22 of the functional modules 4 are in the same plane. Each of the functional modules 4 is placed on or surrounded by a frame 352 of the functional module and fixed to a casing 25 that houses the functional module through bolts 353 to enable attachment or detachment in units of functional modules 4.

It is desirable that the size (bolt diameter) of the bolts 353 and the size (bolt diameter) of a bolt 354 for the power line terminals be the same from the point of view of operational efficiency during attachment or detachment of the functional modules 4. By doing so, it is only necessary to prepare one size of wrench for the bolt 354 for the power line terminals and for the bolts 353 during attachment or detachment of the functional modules 4, which enhances workability. In FIG. 8, a bolt (a connector) 355 for the signal line terminals and a cooling fin 356 for the functional modules are shown. The vehicle control device is fixed to a vehicle body using a bracket 340.

According to the present embodiment, the plural functional modules are adjacently arranged so that the interface surfaces face in the same direction. There can be a large or small gap between the functional modules. Because the device is configured by the plural functional modules 4 having the interface surfaces 22 according to the design rules previously standardized, units for maintenance or inspection can be concentrated for each function and accordingly a maintenance or inspection operation can be streamlined. That is, when the functional modules are arranged so that the interface surfaces on which the power line terminals and the signal line terminals are concentrated face in the same direction, attachment or detachment of the power lines and the signal lines that are connected to the functional modules is performed from one side, for example, from one side surface. In the example shown in FIG. 8, the operation is performed from the side of an inspection cover 357 by removing the inspection cover 357. Attachment or detachment of the functional modules 4 to or from the vehicle-control device casing can be performed from a side surface of the vehicle-control device casing 25 having a large operation space and providing high workability and thus can be streamlined. In FIG. 8, the power lines and the signal lines can be detached from one side surface, and detachment of the functional modules 4 from the vehicle-control device casing can be performed from the other side surface.

Because the first interface area 5 and the second interface area 6 are located separately in, for example, the upper and lower sections, electro-magnetic interference between the signal lines and the power lines can be effectively suppressed and an electro-magnetic noise path can be easily identified. That is, effects of the measures for EMC can be stably obtained. Further, because the number of power lines can be decreased, operation processes required for assembly, detachment, maintenance, and inspection can be reduced.

As can be understood from FIG. 1, the functional module 4E is a different functional module having an interface surface with a first interface area 5E and no second interface area. The first interface area 5E on the interface surface of the different functional module 4E is arranged on the side on which first interface areas 5A to 5D on the interface surfaces of the other functional modules 4A to 4D are located (on the lower end side, in this example) in common. In the functional module 4E, parts, such as a control circuit substrate and a relay, that obstruct a sound operation of the entire device when they malfunction due to noise are particularly concentrated. This enables to separate these parts from the power lines as much as possible, and measures against noise can be implemented on the functional module 4E in a focused way.

In this manner, also in the functional module 4E, the operations for assembly, detachment, maintenance, and inspection can be streamlined like in the other functional modules 4A to 4D. By arranging the first interface area 5E on the same side as the other first interface areas 5A to 5D, the effect of the measures for EMC can be stably obtained.

When terminals of the same shape are used for all the power line terminals that configure the second interface areas 6 of the plural functional modules 4 as shown in FIG. 7, diameters of cables as the power lines that connect the second interface areas 6 of the functional modules 4 with each other, or widths and thicknesses of conductor busbars can be unified.

The signal lines correspond to wires for transmitting or receiving a control signal for a semiconductor switch element, a power signal equal to or lower than about 100 volts, a relay output signal, an input power supply for sensors, and an output signal, and wire materials thereof. The power lines are wires and wire members, which are not included in the signal lines.

Figure 15:
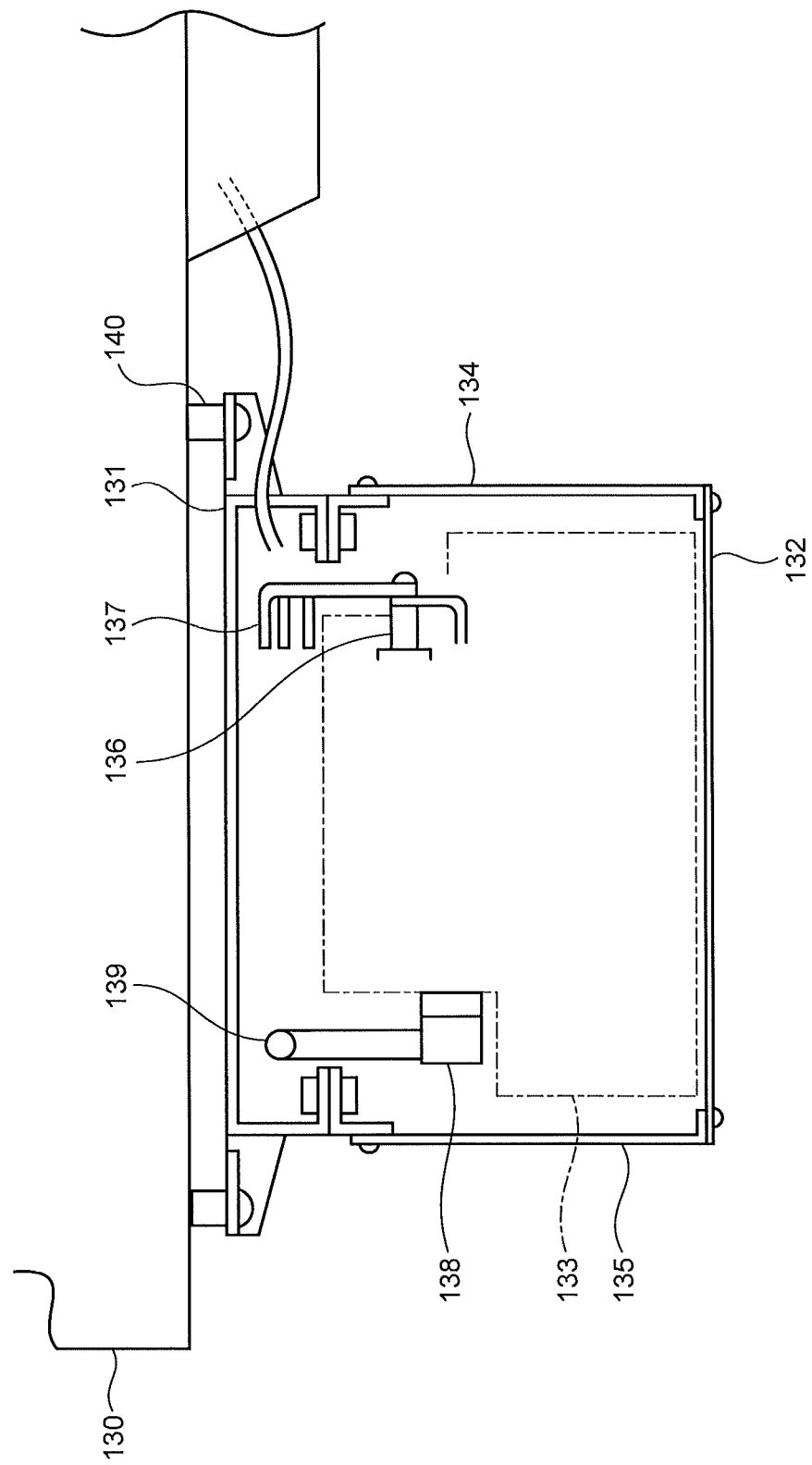
FIG. 15 is a cross-sectional view of a conventional vehicle control device.

FIG. 15 is a cross-sectional view of a conventional vehicle control device disclosed in Patent Document 3. An upper casing 131 is attached to a bracket 140 of a vehicle body to be fixed underneath a floor of a vehicle 130, and a lower casing 132 is attached and fixed to the upper casing 131. The lower casing 132 houses an internal device unit 133 as a main part of the control device. An inspection cover 134 is provided on one side surface of the lower casing 132 in an openable and closable manner. An inspection cover 135 is provided on the other side surface of the lower casing 132 in an openable and closable manner. A power-line fastening member 136 is located on one side of the internal device unit 133, and a power line 137 connected thereto is drawn to the upper casing 131.

A signal line connector 138 for devices is located on the other side of the internal device unit 133, and a signal line 139 connected thereto is drawn to the upper casing 131. Also in this vehicle control device described in Patent Document 3, when the internal device unit 133 is to be attached or detached, it is necessary to perform operations not only from one side but also from the other side, which makes attachment, detachment, maintenance, or inspection not easy. It takes time and causes a problem particularly when an emergency repair is required. Further, because the power line 137 is arranged on one side surface and the signal line 139 is arranged on the other side surface, attachment or detachment of the internal device unit 133 is performed from the bottom surface of the casing with lower workability. Therefore, the operation to attach or detach the internal device unit 133 is not easy. According to the present embodiment, the problems of the conventional technique can be overcome.

Second Embodiment

Figure 9:
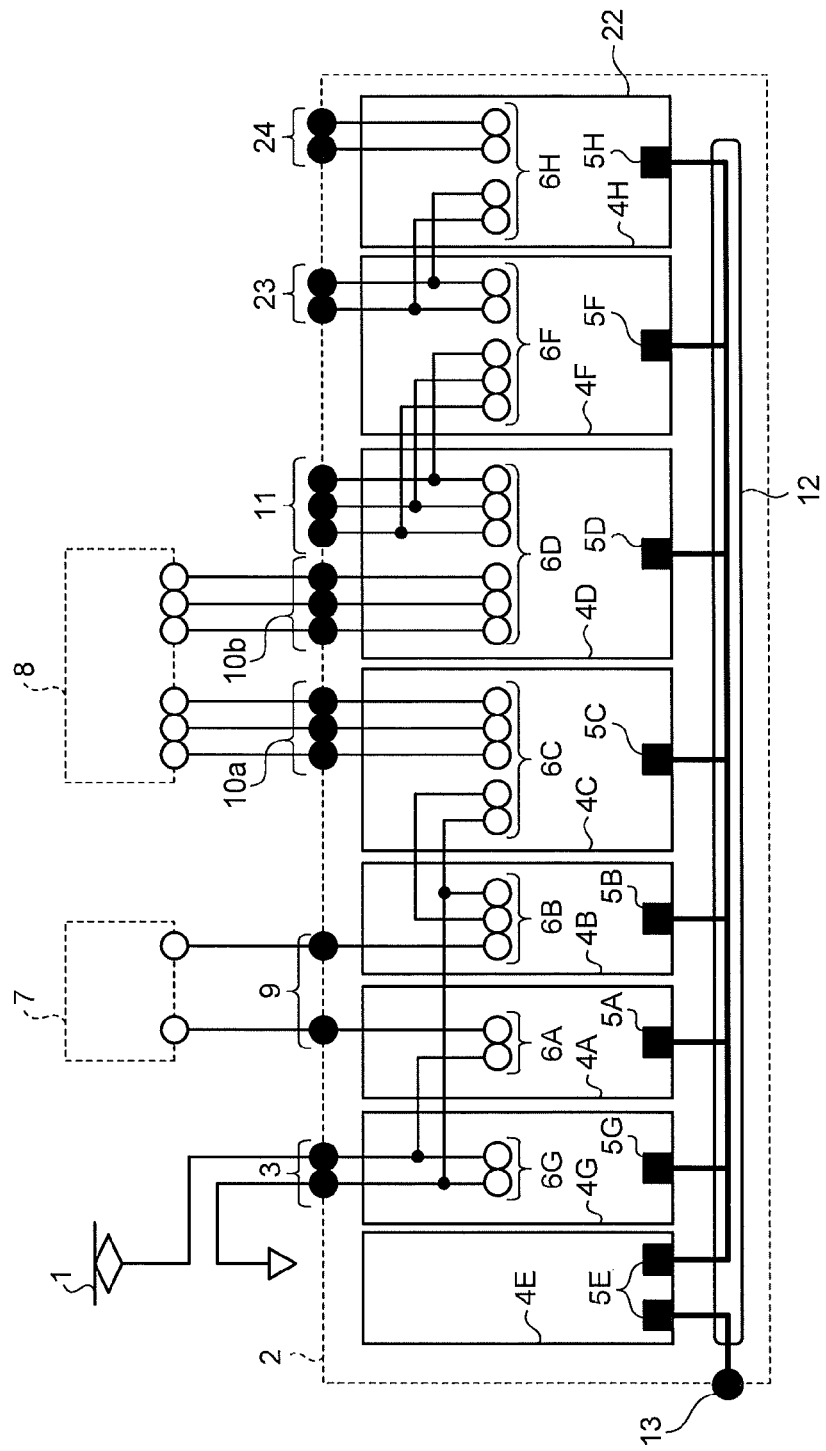
FIG. 9 is a block diagram of an example of a vehicle control device according to a second embodiment.

FIG. 9 is a block diagram of a vehicle control device according to a second embodiment. Addition of functional modules 4 to the configuration shown in FIGS. 1 and 2 is particularly explained. In each of the drawings, reference numerals identical to those shown in FIGS. 1 and 2 denote parts like or corresponding to those shown in FIGS. 1 and 2, and explanations thereof will be omitted. This also applies to the following embodiments.

Examples of the functional modules 4 added here are a functional module 4F (battery charging circuit) having a function to charge a battery mounted on the vehicle, a functional module 4G (emergency feeding circuit) having a function to step down a DC voltage inputted through the overhead wire 1 to feed power to the functional module 4E, and a functional module 4H (DC stepping-down circuit) having a function to receive an output voltage of the functional module 4F and step down the voltage to feed power to another vehicle-mounted device (not shown). The functional module 4G as the emergency feeding circuit functions when the battery voltage becomes lower than a rated voltage. The functional modules 4F, 4G, and 4H are modules as minimum part units that contribute to change in input/output potentials as described in the first embodiment.

The functional module 4F can have any circuit configuration as longus it is an AC/DC converting circuit that can converts an AC voltage as an output from the functional module 4D into a DC voltage required for charging the battery. The functional module 4G can have any circuit configuration as long as it is a DC/DC converting circuit that can step down a high DC voltage inputted through the overhead wire 1 to an appropriate low voltage to be handled by the functional module 4E. The functional module 4H can have any circuit configuration as long as it is a DC/DC converting circuit that can step down a DC voltage outputted from the functional module 4F to a different DC voltage. In FIG. 9, terminal groups 23 and 24, first interface areas 5F, 5G, and 5H, and second interface areas 6F, 6G, and 6H are shown.

Also when the functional modules 4F, 4G, and 4H are to be added in this way, the functional modules 4F, 4G, and 4H having the new functions can be easily added without any change in the configurations of the interface surfaces 22 of the other functional modules 4 by similarly applying the standardized design rules of the first embodiment. That is, structure design can be simplified when the functions of the vehicle control device are to be expanded. Further, because the original configurations of the functional modules 4 are not changed, reliability of the functional modules 4 is maintained.

By configuring the functional modules as minimum part units that contribute to change in the input/output potentials, the functional modules are designed to be separated (not interfered) from each other for each function. Accordingly, maintenance at device failure can be performed by inspecting or replacing only a functional module having a problem without inspecting or replacing the other functional modules, and the device can be promptly restored.

Production of the casing of the vehicle control device and the functional modules is functionally separated and can be performed independently. Therefore, the device casing and the functional modules can be produced concurrently, which reduces lead time. Design of the device casing and the functional modules is also functionally separated and can be performed independently. Accordingly, when design of a functional module is to be changed, change in designs of the other functional modules is not accompanied. The device casing and the functional modules can be designed concurrently, which reduce design time. Because the design of the device casing and the functional modules can be independently performed, outsourcing of the design can be easily realized.

Figure 10:
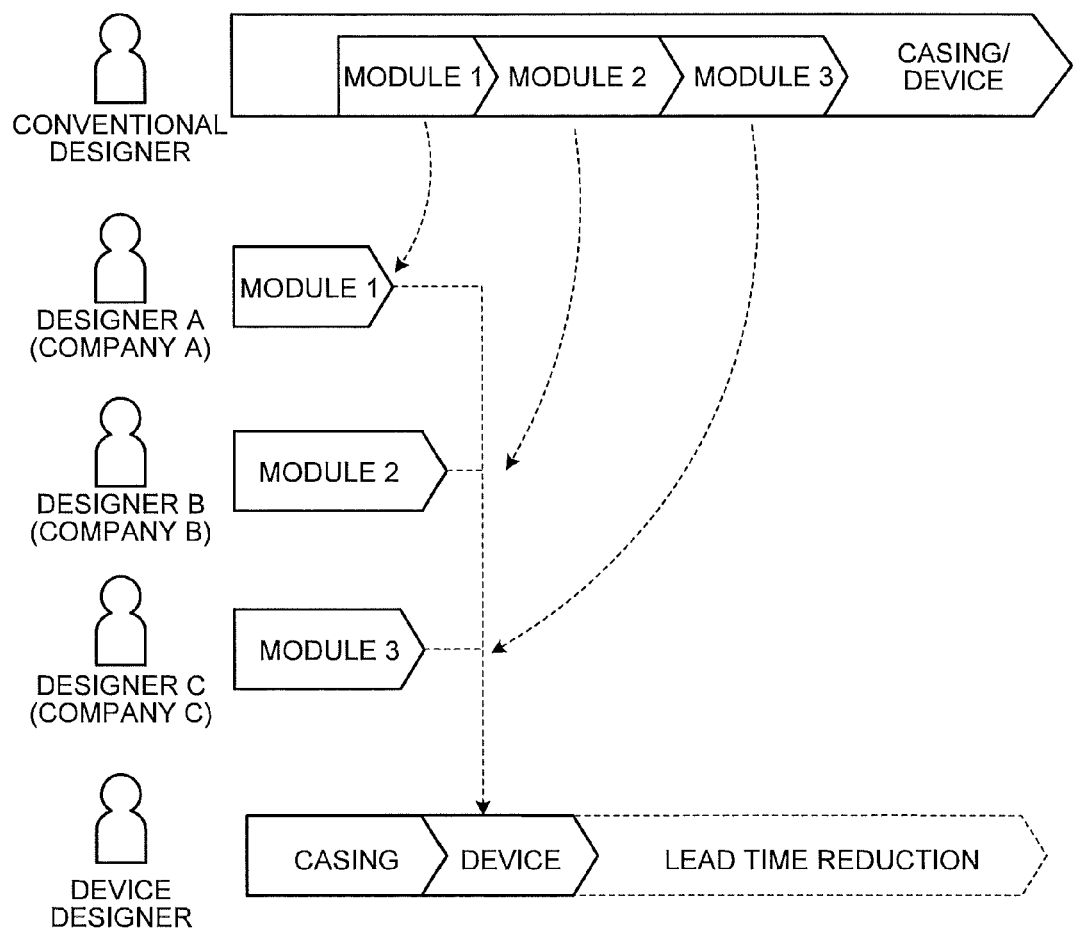
FIG. 10 is an explanatory diagram of reduction in procurement time during design and production of a vehicle control device.

FIG. 10 is an explanatory diagram of reduction in design and lead times of the vehicle control device. Conventionally, a functional module 1, a functional module 2, a functional module 3, and a casing are designed and produced serially. Meanwhile, in the present embodiment, the functional module 1, the functional module 2, the functional module 3, and the casing can be separated, and designed and produced concurrently, and therefore the design and the lead times can be reduced.

Because the vehicle-auxiliary power-supply device of the first embodiment includes a combination of the functional modules functionally separated, when addition, elimination, or improvement of a functional module is to be performed by request from a vehicle operating company, design change of the other functional modules is not accompanied. Accordingly, while combinations of functions vary according to products in the vehicle-auxiliary power-supply devices, addition, elimination, or improvement of a functional module can be easily performed in the vehicle-auxiliary power-supply device according to functions required for each product. Therefore, it is possible to readily deal with various requests and streamline operations for changing the design. Even when a part is broken or maintenance parts are discontinued, only the relevant functional module can be re-designed and replaced, which suppresses risks of interference with the vehicle operation.

Third Embodiment

Figure 11:
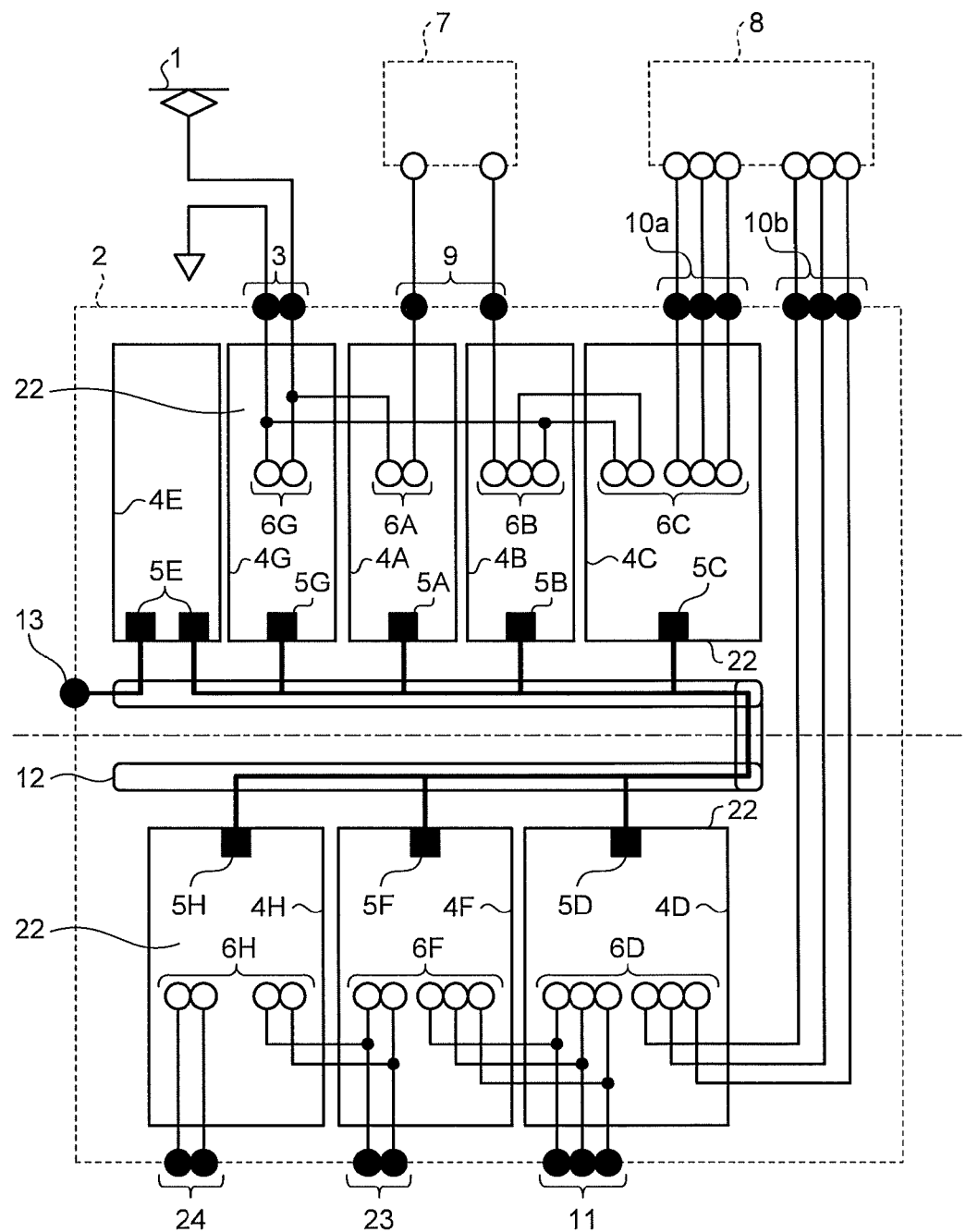
FIG. 11 is a block diagram of an example of a vehicle control device according to a third embodiment.

FIG. 11 is a block diagram of a vehicle control device according to a third embodiment. In FIG. 9, the functional modules 4A to 4H are all arranged horizontally abreast. In FIG. 11, the functional modules 4 are divided into two groups to be arranged in two lines that are upper and lower lines (or in two lines in a horizontal direction).

Each of the functional modules 4 has one interface surface 22 including the first interface area 5 in which a group of the signal line terminals is concentrated on one end side, and the second interface area 6 in which a group of the power line terminals is concentrated on the other side. The functional module 4E has an interface surface including only the first interface area 5 in which the group of the signal line terminals is concentrated on one end side. The interface surfaces of each of the lines are arranged to face in the same direction in common. The interface surfaces of each of the lines have in common the first interface areas 5 located on a side between the lines, and have in common the second interface areas 6 located on a side opposite to the side between the lines. The line-bundle housing unit 12 for the signal lines is placed between the lines to house the signal lines that connect to the first interface areas 5. The power lines that connect to the second interface areas 6 are placed on the side opposite to the side between the lines.

In this manner, when the first interface areas 5 of each of the lines are arranged on the side between the lines in common, a distance between the lines can be shortened because the signal lines are at low voltages. The first interface areas 5 of each line are arranged on the side between the lines in common. Conversely, it is possible that the second interface areas 6 of each line are arranged on the side between the lines in common.

According to the third embodiment, each line of the vehicle-control device body 2 is configured by the plural functional modules 4 each having the interface surface 22 according to the design rules previously standardized. Therefore, units of maintenance or inspection can be concentrated for each function, and also the units of maintenance or inspection can be checked from one side, which streamlines the maintenance or inspection operation. Because the first interface areas 5 of the respective lines and the second interface areas 6 of the respective lines are separately arranged on the side between the lines and on the opposite side, electromagnetic interference between the signal lines and the power lines can be effectively suppressed. Furthermore, because the number of power lines can be reduced, the operation, processes required for assembly, detachment, maintenance, or inspection can be reduced.

Fourth Embodiment

Figure 12:
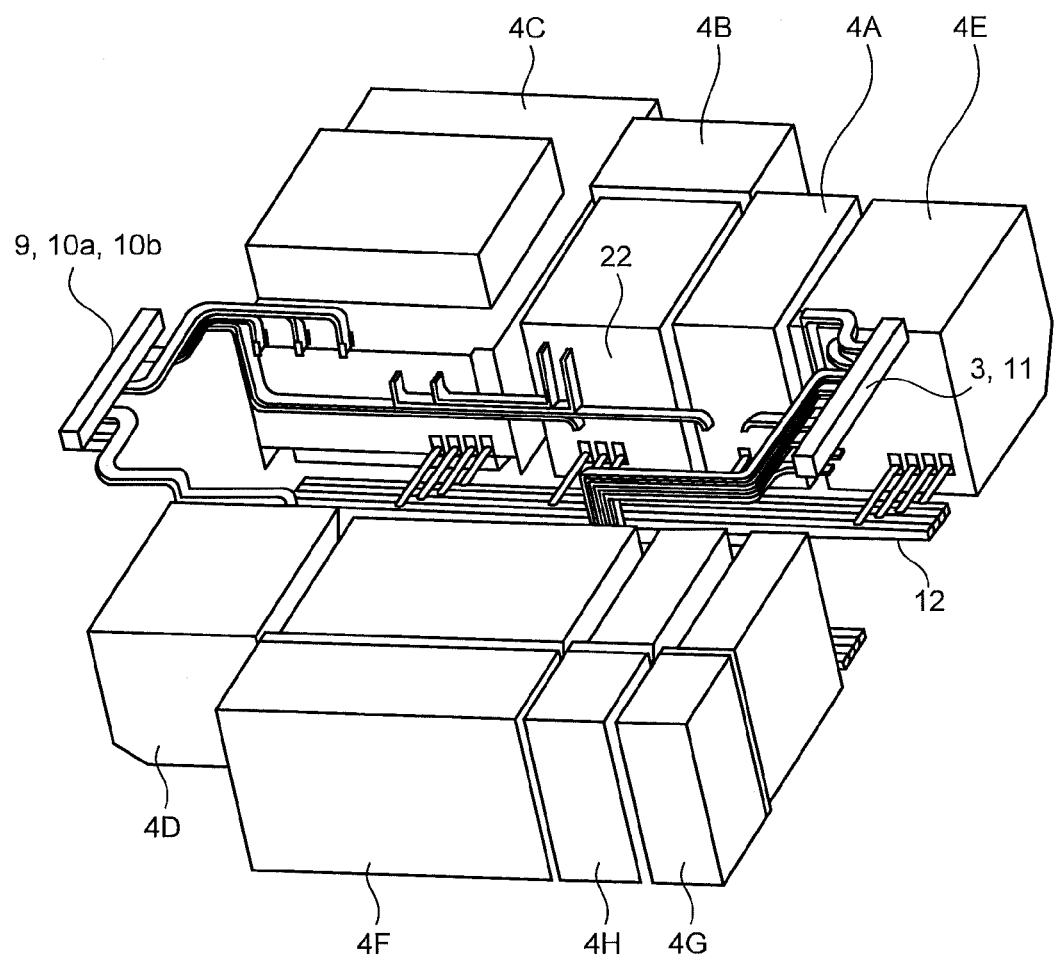
FIG. 12 is an outline perspective view of an example of a vehicle control device according to a fourth embodiment with a casing removed therefrom.

FIG. 12 is an outline perspective view of a vehicle control device according to a fourth embodiment with a casing removed therefrom. In FIG. 12, each of the functional modules has the interface surface 22 separately including a first interface area in which a group of signal line terminals is concentrated and a second interface area in which a group of power line terminals is concentrated. The plural functional modules are divided into two groups, the interface surfaces of each group are adjacently arranged to face in the same direction, and the interface surfaces of one of the groups and the interface surfaces of the other group are arranged face to face. On the respective interface surfaces, the first interface areas are arranged on one side (the lower end side in FIG. 12) in common, and the second interface areas are arranged on the other side (the upper end side in FIG. 12) in common. The functional module 4E has only the first interface area in which the group of signal line terminals is concentrated on the interface surface, and the first interface area is located on one side (the lower end side in FIG. 12). By dividing the plural functional modules into two groups and arranging the interface surfaces of one of the groups and the interface surfaces, of the other group face to face, lengths of the power lines and the signal lines can be shortened.

In FIG. 12, the input terminal group 3 and the output terminal group 11 are arranged on the observers' right, and the terminal groups 9, 10a, and 10b are on the observers' left, all of which are located on the upper side. The line-bundle housing unit 12 is placed on the lower side. When the first interface area is on the lower end side, it is unnecessary to hang the signal lines to be fixed, and the signal lines can be easily housed in a wiring duct having a function to bundle the signal lines and being placed on the bottom surface of the casing. Therefore, a way to bundle and fix the signal lines can be simplified and the costs can be reduced. When the number of signal lines or signal line bundles is large, an assembly operation and a maintenance or inspection operation for the device can be facilitated by looking from an underside of the vehicle.

Even when the functional modules 4 in various sizes are arranged, the interface surfaces 22 are parallel to each other. FIG. 12 depicts a case in which, regarding the interface surfaces of one of the groups and the interface surfaces of the other group, the interface surfaces 22 of the plural functional modules 4 that are arranged horizontally are in the same plane, and this case is a most suitable example. However, even when the interface surfaces 22 of some of the functional modules 4 are out of alignment, the device does not deviate from the embodiment of the present invention as long as the interface surfaces 22 are parallel to each other.

As described above, most suitable arrangement of the interface areas is obtained in a case where the first interface areas of the functional modules are in the same plane, and the second interface areas of the functional modules are in the same plane. In this case, the signal lines and the power lines that connect the interface areas with each other can be placed in the same plane, which simplifies the wiring path the most. Furthermore, because the wiring length can be reduced and the power line processing can be simplified, inexpensive and lightweight power lines can be used.

As can be understood from FIG. 12, fundamental movement lines of an operator that mechanically mounts or electrically connects the functional modules 4 can be set in a horizontal direction even when the functional modules 4 have different shapes. Accordingly, difficulty of the operation itself can be lowered and also the operation processes can be reduced. Furthermore, an operation for confirming that the operation has been reliably performed becomes easier. For example, an operator that mounts a bundle of signal lines, so-called harness, can perform the operation without frequently moving his/her eyes up and down. In addition, the electro-magnetic interference between the power lines and the signal lines can be similarly suppressed effectively. In this manner, even when the functional modules 4 have different shapes, the same effect can be obtained.

As shown in FIG. 12, by placing the interface surfaces 22 of the plural functional modules 4 in parallel to each other, the line-bundle housing unit 12 in the form of wiring duct that is common to the signal lines connected to the first interface areas of the functional modules 4 can be provided. This makes the mounting state of the signal line bundle, so-called harness, hard to be affected by variations in the operation and makes the mounting state always stable. Therefore, electro-magnetic separation between the signal lines and the power lines outside the functional modules 4 is ensured, and tolerance for noise can be enhanced.

Figure 13:
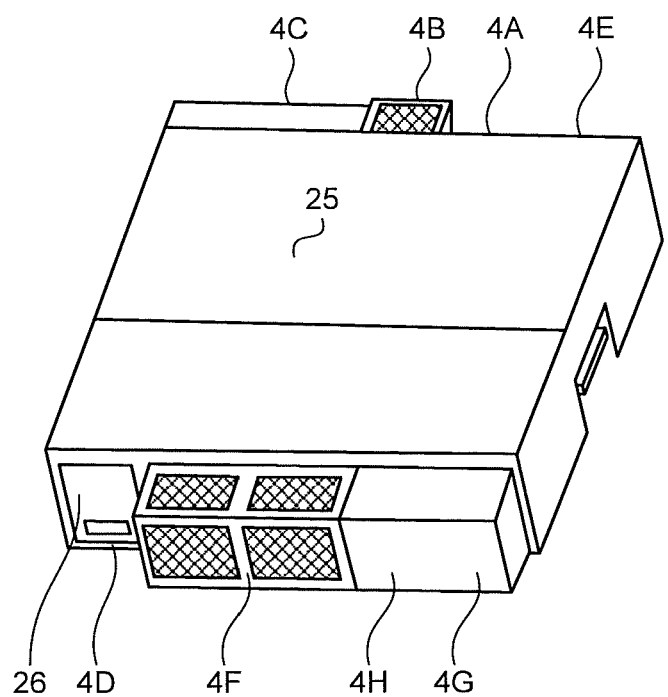
FIG. 13 is an outline perspective view of the vehicle control device covered with a casing according to the fourth embodiment.

FIG. 13 is an outline perspective view of a device to be equipped to an actual vehicle, which is obtained by arranging the functional modules 4 shown in FIG. 12 in the form of a box and covering with a device casing 25. In FIG. 13, when an inspection cover 26 is opened, for example, the functional modules 4 to be inspected can be seen.

Fifth Embodiment

Figure 14:
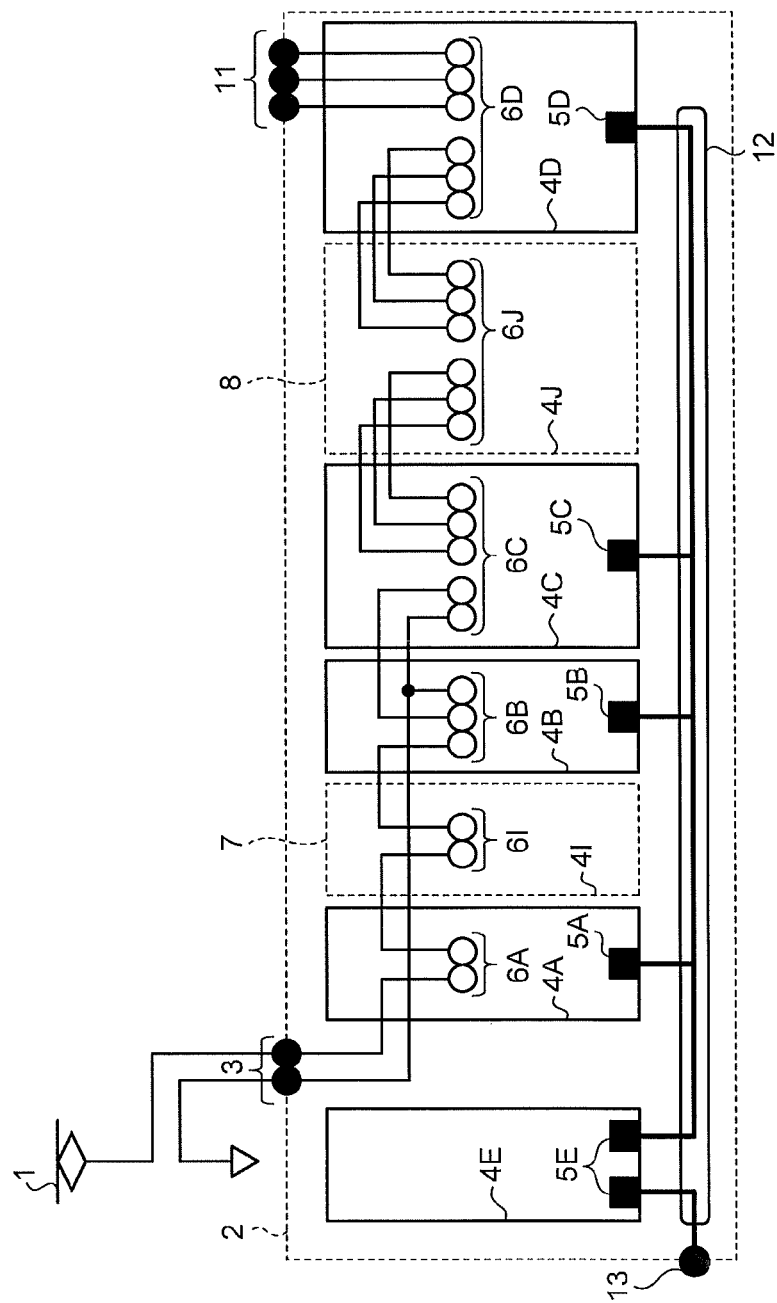
FIG. 14 is a block diagram of an example of a vehicle control device according to a fifth embodiment.

FIG. 14 is a block diagram of a vehicle control device according to a fifth embodiment. The reactor 7 and the transformer 8 that are separated from the deice body in FIG. 1 are housed in the vehicle-auxiliary power-supply body 2 in FIG. 14. Also in this example, different modules 4I and 4J that form the reactor 7 and the transformer 8 have interface surfaces including second interface areas 6I and 6J in which a group of power line terminals is concentrated and including no first interface areas, respectively. The interface surfaces are arranged on one side (the upper end side in FIG. 14) in common to align the second interface areas 6I and 6J with the second interface areas 6A to 6D of the other functional modules 4A to 4D. This enables production of the device without affecting the configurations or structures of the other functional modules 4A to 4D.

In this manner, also in the modules 4I and 4J, the operations for assembly, detachment, maintenance, and inspection can be streamlined like in the other functional modules 4A to 4D. By arranging in common the second interface areas 6I and 6J on the same side as the other second interface areas 6A to 6D, the effect of the measures for EMC can be stably obtained.

Sixth Embodiment

A sixth embodiment is explained with reference to FIGS. 16 to 21. While FIGS. 1 to 6 depict the circuit configurations mainly targeted at a vehicle lighting apparatus or an air-conditioning system as the load, FIGS. 16 to 21 depict circuit configurations (VVVF) mainly targeted at a vehicle driving motor as a load.

Figure 16:
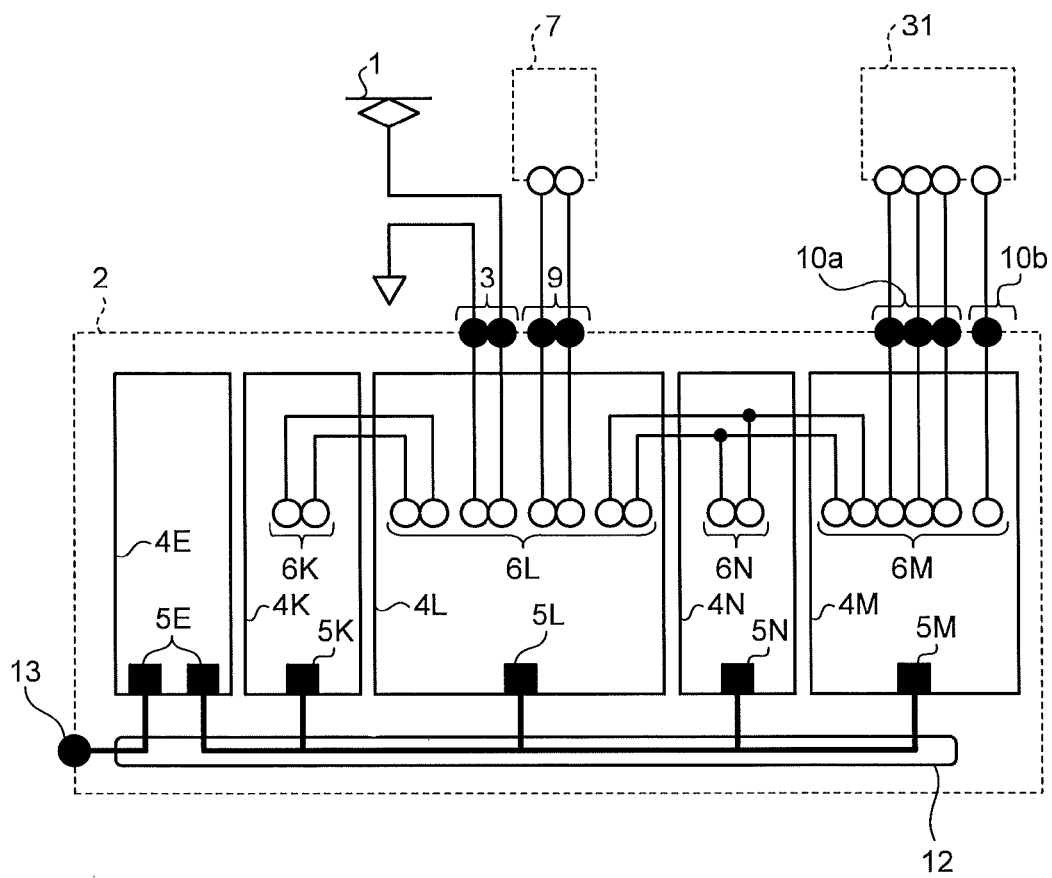
FIG. 16 is a block diagram of an example of a vehicle control device according to a sixth embodiment.
Figure 17:
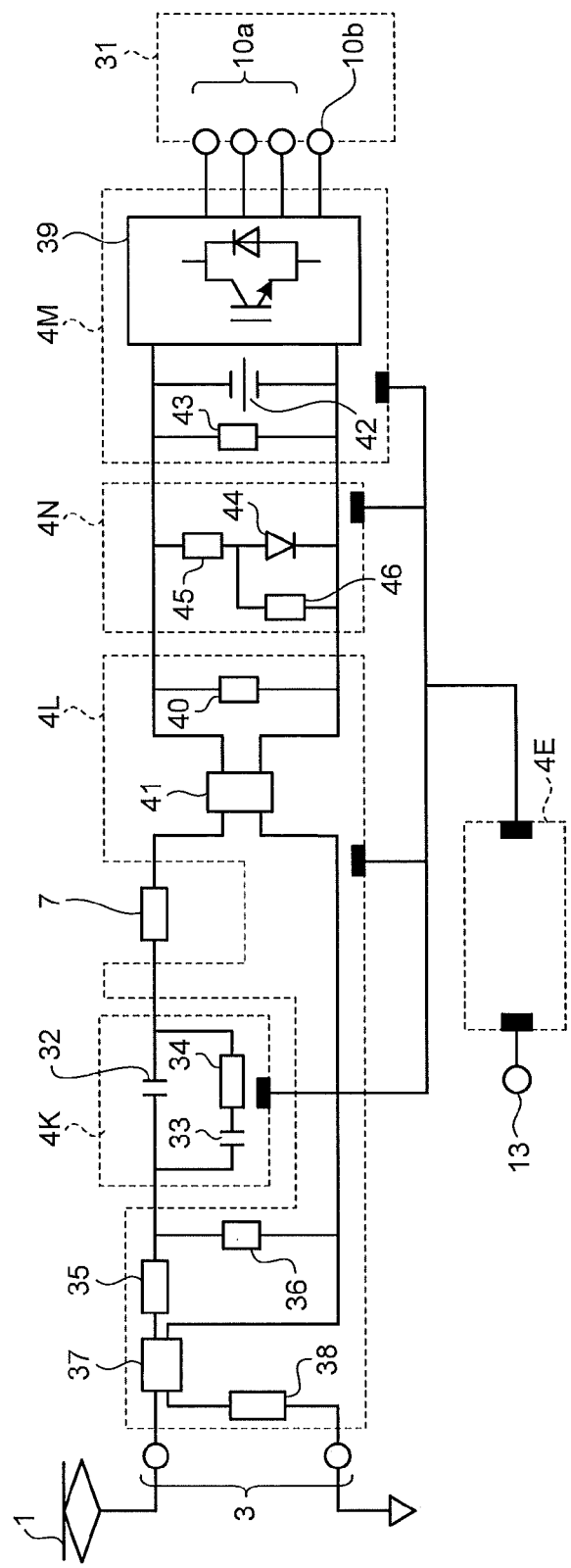
FIG. 17 is a circuit configuration diagram of a specific example of FIG. 16.

FIGS. 16 and 17 are explained first. FIG. 16 is a block diagram of an example of a vehicle control device according to the sixth embodiment, and FIG. 17 is a circuit configuration diagram of a specific example of FIG. 16. In FIGS. 16 to 21, like components as those in FIGS. 1 to 6 are denoted by like references. In FIG. 16, the vehicle-control device body 2 is connected to the overhead wire 1 (on the sides of the overhead wire and the ground) through the input terminal group 3. References 4K, 4L, and 4M denote functional modules, which are minimum part units that contribute to change in input/output potentials, respectively, like in the first embodiment. Reference character 4N denotes a module including parts that do not contribute to change in input/output potentials. Reference character 4E denotes the same functional module as that in the first embodiment. All the functional modules 4K, 4L, 4M, and 4E and the module 4N have first interface areas 5K, 5L, 5M, 5E, and 5N in which a group of signal line terminals is concentrated, and the functional modules 4K, 4L, and 4M and the module 4N except for the functional module 4E have second interface areas 6K, 6L, 6M, and 6N in which a group of power line terminals is concentrated.

The reactor 7 is connected to the vehicle-control device body 2 through the terminal group 9. A motor 31 is connected to the vehicle-control device body 2 through the terminal groups 10a and 10b. The line-bundle housing unit (wiring duct) 12 that houses a bundle of signal lines is placed inside the vehicle-control device body 2. The vehicle-control device body 2 also includes the control input-terminal group 13 for transmitting or receiving information to or from a controller (not shown) that performs superior control of the vehicle control device.

Main functions of the functional modules and the module are explained. The functional module 4K is an opening/closing circuit having a function to electrically connect to or disconnect from the overhead wire 1 (a DC power supply, in this example). The functional module 4L includes a voltage sensor, a current sensor, and the like as components, and has a function to monitor operation situations of a voltage and a current of the vehicle control device and a function to relay connection between the functional modules and the module. The module 4N includes a switching unit and a resistor as components and has a function to suppress an overvoltage. The functional module 4M has a function to convert a DC voltage into an AC voltage. The functional module 4E is a control circuit that controls the entire vehicle control device according to a signal transmitted from the superior controller. FIG. 17 is a circuit configuration diagram of the vehicle control device shown in FIG. 16. FIG. 17 also depicts an example of division of the functional modules 4K, 4L, 4M, and 4E and the module 4N according to the functional definitions. Main parts as components for the functional modules and the module 4 are explained. The functional module 4K has a switch 32, a charge contactor 33, and a charge resistor 34 as the components. The functional module 4L is a monitoring circuit including a current sensor 35 that monitors an overhead current, a voltage sensor 36 that monitors an overhead voltage, a differential current sensor 37 that detects presence of a leak current based on a current difference between positive and negative sides, a ground switch 38, a voltage sensor 40 that monitors a DC voltage of a switching circuit 39, and a core 41 that absorbs unwanted electro-magnetic waves. The functional module 4M is an inverter including a capacitor 42, the switching circuit 39, and a discharge resistor 43. The module 4N is an overvoltage preventing circuit including a switching unit 44, a resistor 45, and a voltage sensor 46. While placed in the module 4N in FIG. 17, the voltage sensor 46 can be placed in the functional module 4L. FIG. 17 does not depict some parts, some voltage sensors and some current sensors, for example. Some vehicles have a form in which the functional module 4K having the opening/closing circuit is placed outside the vehicle-control device body (which will be explained in detail with reference to FIG. 22).

The functional module 4L as the monitoring circuit connects the overhead wire 1, the reactor 7, the functional module 4K as the opening/closing circuit, the module 4N as the overhead preventing circuit, and the functional module 4M as the inverter to serve a connection relay function, and also serves various monitoring functions at the connections. In this manner, the functional module 4L as the monitoring circuit can serve a function including the connection relay function and the various monitoring functions, which streamline functional modules. Also in the vehicle control device according to the present embodiment, when a functional module 4 has a problem, the number of the functional modules and module 4 that have to be inspected or replaced can be always suppressed. Thus, the inspection or replacement can be performed in a short time, and the device can be promptly restored.

Figure 18:
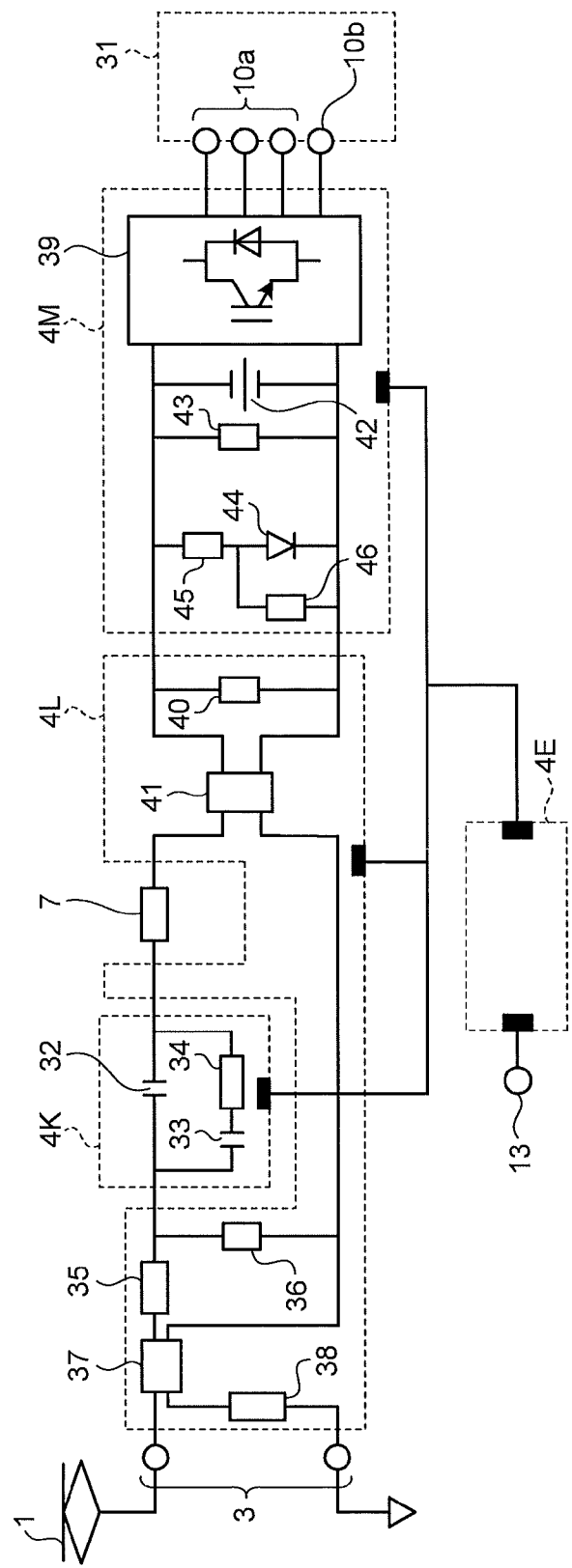
FIG. 18 is another configuration example of functional modules 4K, 4L, and 4M shown in a circuit configuration diagram.
Figure 19:
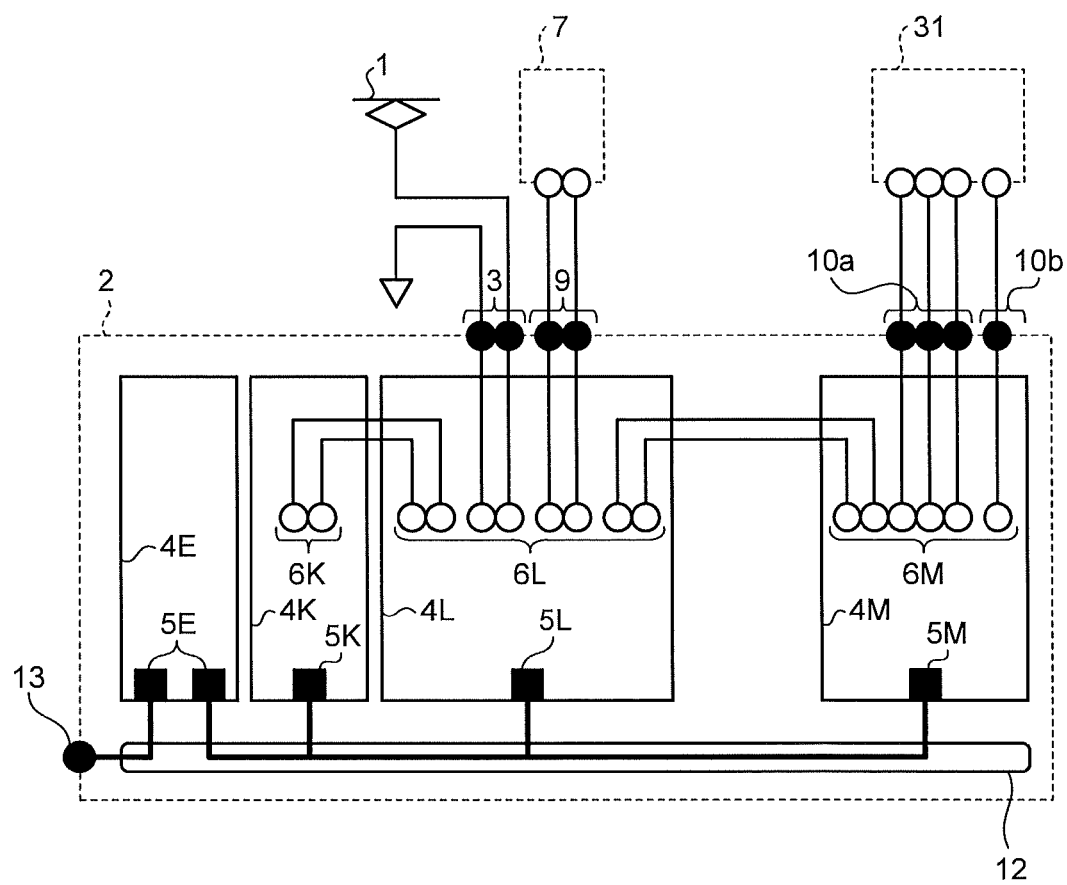
FIG. 19 is a block diagram of a vehicle control device corresponding to FIG. 18.

FIG. 18 is another configuration example of the functional modules 4K, 4L, and 4M shown in a circuit configuration diagram. As shown in FIG. 18, while the circuit configuration is the same as that shown in FIG. 17, the module 4N in FIG. 17 is not included and the functional module 4M has a different configuration as that shown in FIG. 17 instead. That is, the functional module 4M includes parts that do not contribute to change in the input/output potentials and are included in the module 4N. FIG. 19 is a block diagram of a vehicle control device corresponding to FIG. 18. When the functional modules 4K, 4L, and 4M are configured as shown in FIGS. 18 and 19, the number of modules is reduced, and the number of parts and the operation man-hours are reduced, as compared to the example shown in FIGS. 16 and 17.

Figure 20:
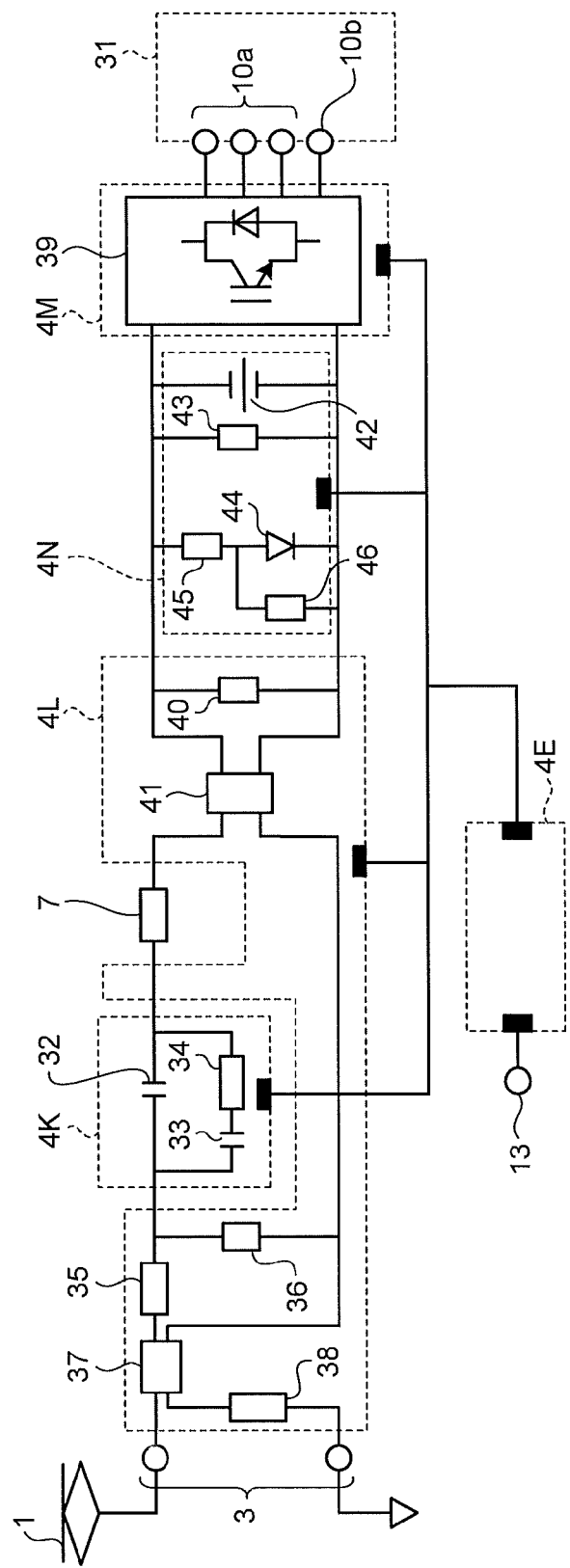
FIG. 20 is another configuration example of the functional modules 4K, 4L, and 4M, and a module 4N shown in a circuit configuration diagram.
Figure 21:
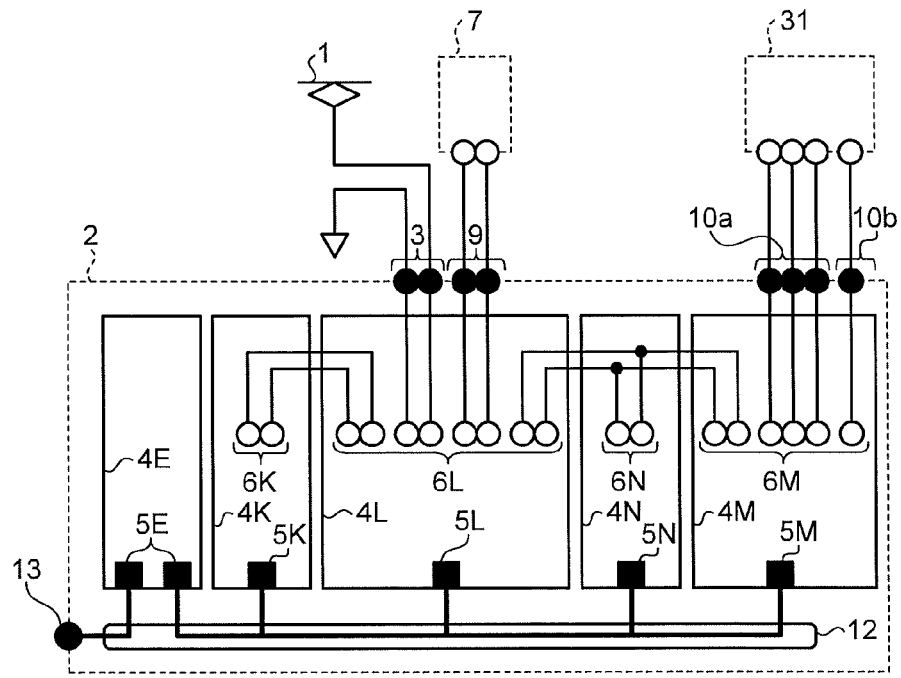
FIG. 21 is a block diagram of a vehicle control device corresponding to FIG. 20.

FIG. 20 is another configuration example of the functional modules 4K, 4L, and 4M and the module 4N shown in a circuit configuration diagram. As shown in FIG. 20, while the circuit configuration is the same as that shown in FIG. 17, the module 4N and the functional module 4M have different configuration from those in FIG. 17. That is, in FIG. 20, the functional module 4M includes only the switching circuit 39, and the module 4N includes the capacitor 42 and the discharge resistor 43 in addition to the switching unit 44, the resistor 45, and the voltage sensor 46. That is, because the capacitor 42 and the discharge resistor 43 are parts that do not contribute to change in the input/output potentials, they can be included in the module 4N rather than in the functional module 4M. FIG. 21 is a block diagram of a vehicle control device corresponding to FIG. 20. As shown in FIG. 21, there is no increase or decrease in the number of modules or the number of terminals in this example as compared to the example shown in FIG. 17.

Also in the present embodiment, the functional modules and module 4 have the interface surfaces 22 (FIG. 7) with the first interface areas 5 and the second interface areas 6 in the same plane, like in the first embodiment. A group of signal line terminals is concentrated in the first interface area 5, and a group of power line terminals is concentrated in the second interface area 6. All the functional modules and the module (except for the functional module 4E) applied to the first embodiment are designed based on the design rules previously standardized, as shown in FIG. 7.

That is, like in the first embodiment, the functional modules and the module having the signal line terminals and the power line terminals according to the design rules previously standardized each have the interface surface on one side, separately including the first interface area 5 in which the signal line terminals are concentrated and the second interface area 6 in which the power line terminals are concentrated. On the respective interface surfaces, the first interface areas 5 are located on one end side in common and the second interface areas 6 are located on the other end side in common.

According to the present embodiment, the plural functional modules and the module are adjacently arranged so that the interface surfaces face in the same direction. Because the device includes the functional modules and module 4 having the interface surface 22 according to the design rules previously standardized, units of maintenance or inspection are functionally concentrated, which streamlines the maintenance or inspection operation. Further, the electro-magnetic interference between the signal lines and the power lines can be effectively suppressed. Because the number of power lines can be reduced, the operation man-hours required for assembly, detachment, maintenance, or inspection can be reduced.

The functional module 4E is a different functional module having the interface surface with the first interface area 5E and no second interface area. The first interface area 5E of the interface surface of the different functional module 4E is located on the side on which the first interface areas 5K, 5L, 5M, and 5N of the interface surfaces of the other functional modules 4K, 4L, and 4M and the module 4N are located in common. Accordingly, the effect of the measure for EMC can be stably obtained.

When there is similarly a different functional module or module 4 having an interface surface with the second interface area 6 in which a group of power line terminals is concentrated and no first interface area, the second interface area 6 of the interface surface is located on the same side on which the second interface areas 6 of the other functional modules and the module are located in common. Accordingly, the effect of the measures for EMC can be stably obtained.

As shown in FIG. 8, the functional modules and module 4 are placed on or surrounded by the frame 352 to enable attachment or detachment in units of the functional modules or module 4, and fixed to the casing 25 that houses the functional modules or module through the bolts 353. It is desirable that the size (bolt diameter) of the bolts 353 be equal to the size (bolt diameter) of the bolt 354 for power line terminals in view of operational efficiency during attachment or detachment of the functional modules or module 4. By doing so, it is only necessary to prepare one size of wrench for the bolt 354 for power line terminals and the bolts 353 during the attachment or detachment of the functional modules 4 or module, which enhances the workability.

Seventh Embodiment

Figure 22:
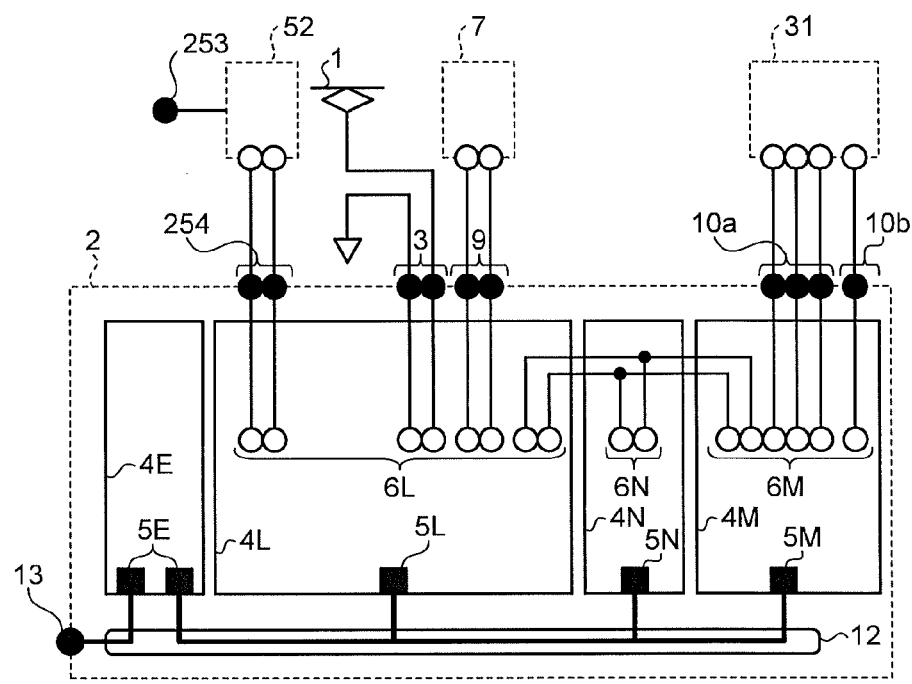
FIG. 22 is a block diagram of an example of a vehicle control device according to a seventh embodiment.

FIG. 22 is a block diagram of an example of a vehicle control device according to a seventh embodiment. In each of the drawings, like references denote like or corresponding parts and redundant explanations thereof will be omitted. This also applies to the following embodiments. FIG. 22 depicts a configuration in which the functional module 4K as the opening/closing circuit housed in the vehicle-control device body in FIG. 16 is separated from the device body. In FIG. 22, an opening/closing circuit 52 is placed outside the device body, and the opening/closing circuit 52 is similar to the functional module 4K. A signal line 253 is connected to the opening/closing circuit 52, and a terminal group 254 is shown.

In the example of the seventh embodiment, the functional module 4L as the monitoring circuit connects the overhead wire 1, the reactor 7, the opening/closing circuit 52, the module 4N as the overvoltage preventing circuit, and the functional module 4M as the inverter to serve a connection relay function, and also serves various monitoring functions at the connections. In this manner, the functional module 4L as the monitoring circuit can serve a function including the connecting function and the various monitoring functions, and accordingly the functional modules can be streamlined.

As shown in the present embodiment, the vehicle control device includes a combination of the functional modules functionally not interfered. Accordingly, when addition, elimination, or improvement of a functional module is to be performed, designs of the other functional modules and the like are not changed and therefore the opening/closing circuit can be added to, eliminated from, or improved for the device body without affecting the configurations or structures of the other functional modules 4L, 4M, and 4E and the module 4N.

When the functional modules are designed to be functionally separated (not interfered) from each other, maintenance at the time of a device failure can be performed by inspecting or replacing only a functional module having a problem without inspecting or replacing the other functional modules or the like. Therefore, the device can be promptly restored.

Production of the casing of the vehicle control device and the functional modules is functionally separated and can be performed independently. Accordingly, the device casing and the functional modules can be produced concurrently, which reduces the lead time. Design of the device casing and the functional modules is also functionally separated and can be performed independently. Therefore, when the design of a functional module is to be changed, change in the designs of the other functional modules and the like is not accompanied. The device casing and the functional modules can be designed concurrently, and the design time can be reduced. Furthermore, because the device casing, the functional modules, and the like can be independently designed, outsourcing of the design can be easily realized (see FIG. 10).

Eighth Embodiment

Figure 23:
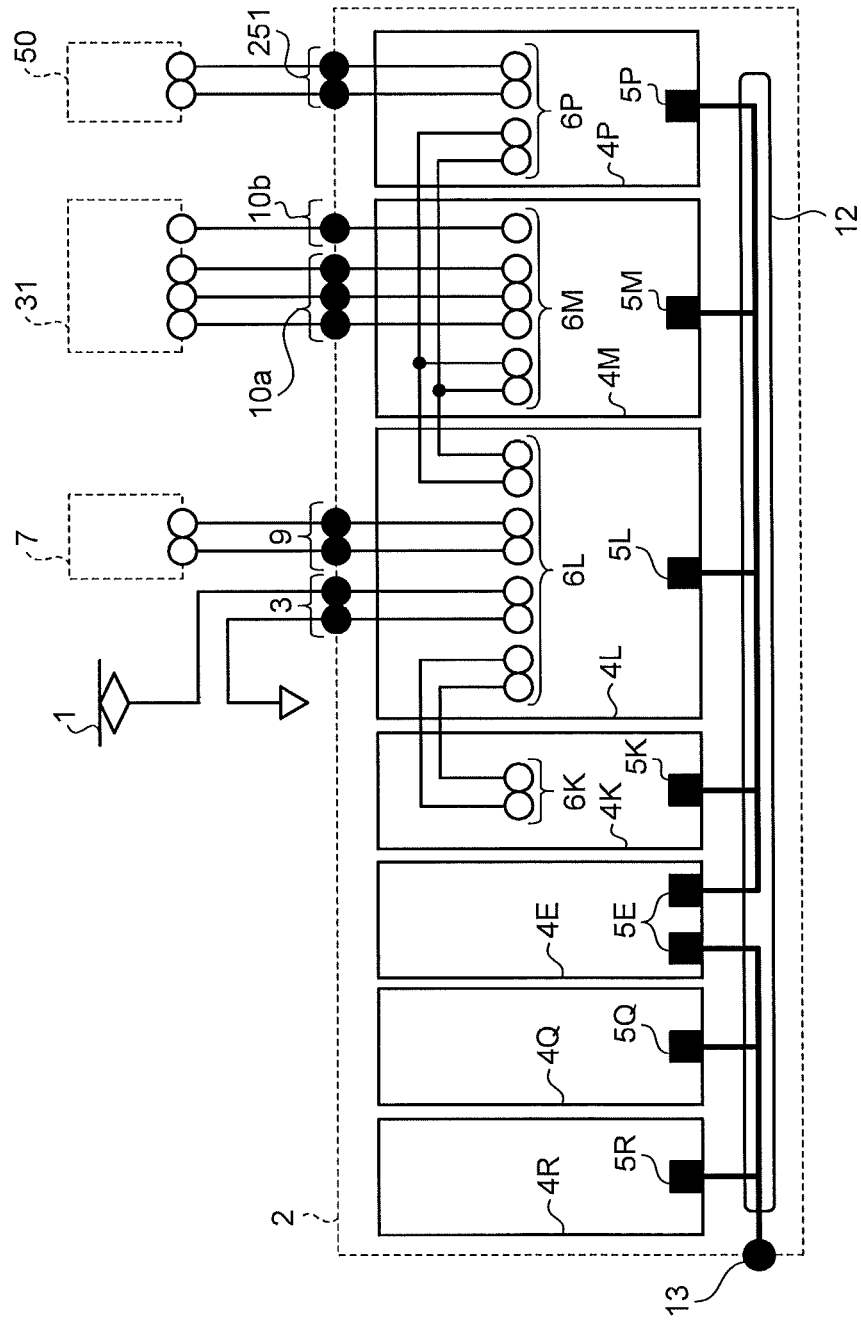
FIG. 23 is a block diagram of an example of a vehicle control device according to an eight embodiment.

FIG. 23 is a block diagram of an example of a vehicle control device according to an eighth embodiment of the present invention. Change and addition of functional modules 4 or a module is especially explained. In this example, the module 4N is changed to a functional module 4P (an overvoltage preventing circuit) having a function to control energy consumed by a braking resistor in a switching element and suppress an overvoltage of the switching circuit 39. Functional modules to be added are a functional module 4Q (CCOS=control circuit cut out switch) having an opening/closing function to separate a vehicle side circuit from a control circuit, and a functional module 4R (train-information managing system) having a function to manage train information and issue an order to devices on the vehicle. In FIG. 23, a braking resistor 50 and a connection terminal group 251 therefor are shown.

FIG. 23 is an example in which the functional module 4P as the overvoltage preventing circuit is placed on the observers' right of the functional module 4M instead of the module 4N as the overvoltage preventing circuit in FIG. 16. The functional module 4P can have any circuit configuration as long as it discharges an overvoltage, and the braking resistor 50 is used in the example shown in FIG. 23. The functional module 4Q can have any circuit configuration as long as it separates the vehicle side circuit from the control circuit.

In the present embodiment, the functional module 4L as the monitoring circuit connects the overhead wire 1, the reactor 7, the functional module 4K as the opening/closing circuit, the functional module 4M as the inverter, and the functional module 4P as the overvoltage preventing circuit to serve a connection relay function, and also serves various monitoring functions at the connections. In this manner, the functional module 4L as the monitoring circuit can serve a function including the connecting function and the various monitoring functions, and accordingly the functional modules can be streamlined.

The thus changed functional module 4P and the added functional modules 4Q and 4R are used while the functional modules are made not to be interfered and the design rules including standardized basic technologies are applied. Thus, the changed functional module 4P and the added functional modules 4Q and 4R can be used without any change in the configurations of the other functional modules. That is, when the functions of the vehicle control device are to be expanded, structure design can be simplified. Because the original structures of the functional modules 4 are not changed, the reliability of the functional modules 4 is maintained.

As shown in the sixth to eighth embodiments, when the functional modules are defined for each function and divided as minimum part units that contribute to change in the input/output potentials, the functional modules can be divided into functional units demanded by the vehicle operating company. When the functional modules are combined, demands on the function of the vehicle operating company can be easily met.

Figure 24:
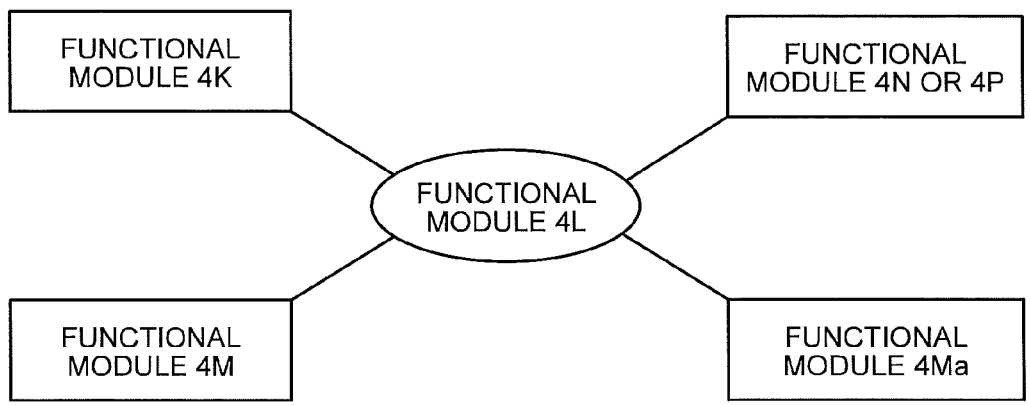
FIG. 24 is a diagram explaining addition or change of a functional module.

FIG. 24 is a diagram explaining addition or change of a functional module. For example, a case in which a functional module 4Ma is to be added to the device according to the sixth embodiment shown in FIG. 16 to increase capacity is considered. In this case, because the functional module 4L having the relay function is included and the functional module 4Ma is functionally separated from the other functional modules, this demand can be easily met only by connecting the functional module 4Ma to the functional module 4L without changing the designs of the other functional modules.

While the functional module 4L having the monitoring circuit is used in the sixth to eighth embodiments as the functional module having the relay function, a functional module having a relay function can be provided separately from the functional module as the monitoring circuit.

According to a function demand of the vehicle operating company, it is necessary to arrange either the module 4N or the functional module 4P within the casing 25 of the vehicle control device (FIGS. 16 and 23). Also in this case, because the functional module 4L having the relay function is included, and the module 4N and the functional module 4P are functionally separated from the other functional modules, the demand can be easily met only by connecting either the module 4N or the functional module 4P, which is demanded by the vehicle operating company, to the functional module 4L, without changing the designs of the other functional modules.

Furthermore, there are the case in which the functional module 4K is placed inside the casing 25 of the vehicle control device (FIG. 16) and the case in which the functional module 4K is placed outside the casing 25 of the vehicle control device (FIG. 22). Because the functional module 4K is defined as described above and functionally separated from the other functional modules and the like, the functional module 4K can be easily placed inside or outside the casing 25 of the vehicle control device without changing the designs of the other functional modules and the like.

That is, addition, elimination, or change of a functional module can be easily realized by doing following things:

(1) Define and divide functional modules in units of function on demands of a client.

(2) Functionally separate each of the functional modules from the other functional modules.

(3) Include a functional module having a relay function. (When a required functional module is connected to the functional module 4L, demands of a client can be flexibly met.)

Ninth Embodiment

Figure 25:
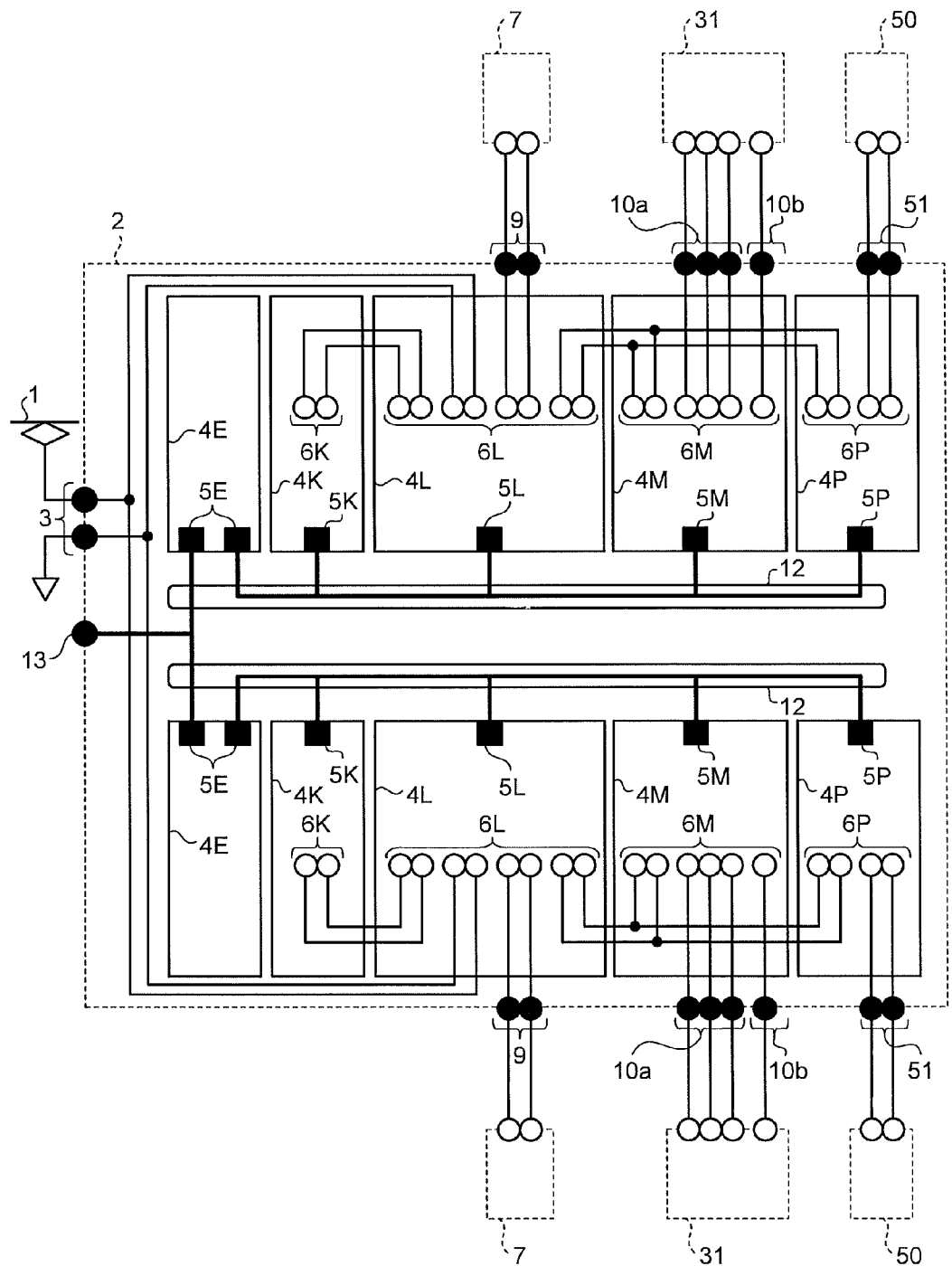
FIG. 25 is a block diagram of an example of a vehicle control device according to a ninth embodiment.

FIG. 25 is a block diagram of an example of a vehicle control device according to a ninth embodiment. While all the functional modules are arranged horizontally abreast in FIG.

16, the functional modules 4 are divided into two groups and arranged in two lines that are upper and lower lines (or two lines in a horizontal direction) in FIG. 25. The respective groups including the plural functional modules are the same.

Each of the functional modules 4 has one interface surface with the first interface area 5 in which a group of signal line terminals is concentrated on one end side and the second interface area 6 in which a group of power line terminals is concentrated on the other end side. The functional module 4E has an interface surface only with the first interface area 5 in which a group of signal line terminals is concentrated on one end side. The interface surfaces of each line are arranged to face in the same direction in common. On the interface surfaces, the first interface areas 5 of the respective lines are located in common on a side between the lines, and the second interface areas 6 of the respective lines are located in common on a side opposite to the side between the lines. The line-bundle housing unit 12 for signal lines is placed between the lines to house signal lines that connect to the first interface areas 5. Power lines that connect to the second interface areas 6 are placed on the side opposite to the side between the lines.

As described above, when the first interface areas 5 of the respective lines are arranged on the side between the lines in common, a distance between the lines can be shortened because the signal lines are at low voltages. The first interface areas 5 of the respective lines are arranged on the side between the lines in common. Conversely, it is possible that the second interface areas 6 of the respective lines are arranged on the side between the lines in common.

According to the present embodiment, each of the lines of the vehicle-control device body 2 is configured by the plural functional modules 4 having the interface surfaces 22 according to the design rules previously standardized, and therefore units of maintenance or inspection are functionally concentrated. Furthermore, because the units of maintenance or inspection can be confirmed from one side, the maintenance or inspection operation can be streamlined. Because the first interface areas 5 of the respective lines and the second interface areas 6 of the respective lines can be separately arranged on the side between the lines and on the opposite side, respectively, the electro-magnetic interference between the signal lines and the power lines can be effectively suppressed. Because the number of power lines can be reduced, the operation processes required for assembly, detachment, maintenance, or inspection can be reduced.

Tenth Embodiment

Figure 26:
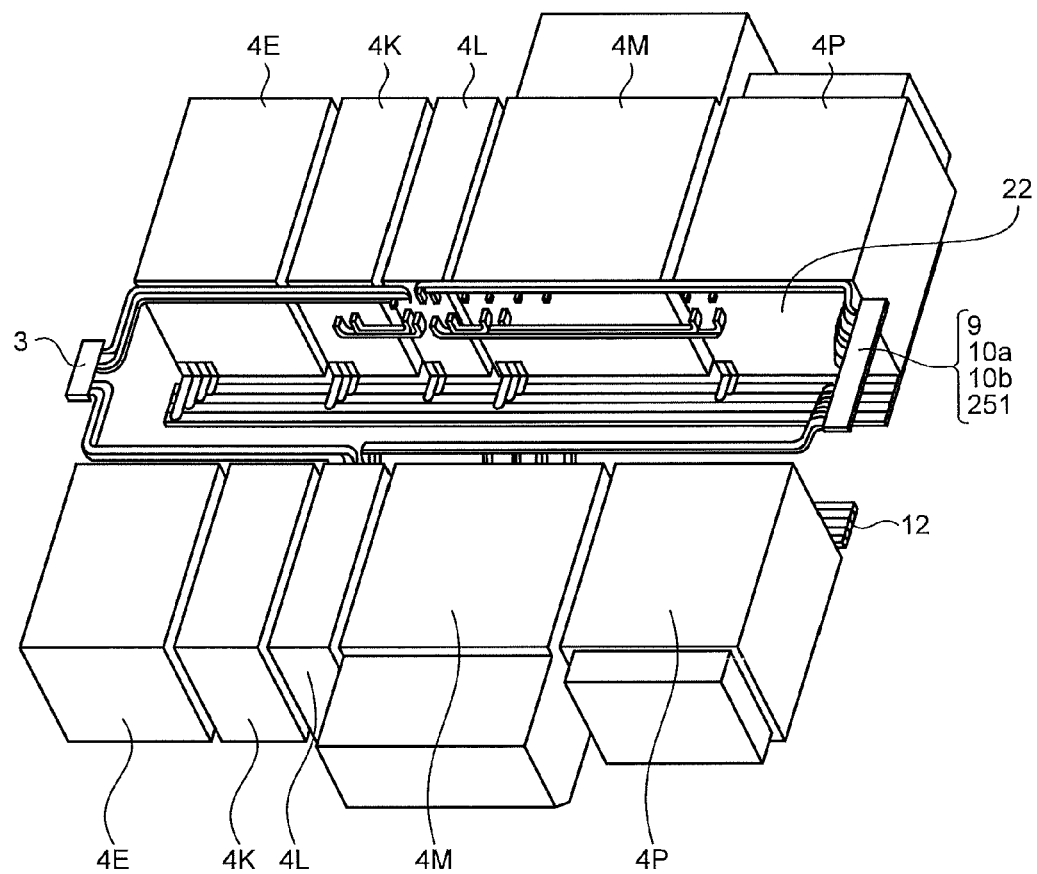
FIG. 26 is an outline perspective view of a vehicle control device according to a tenth embodiment with a casing removed therefrom.

FIG. 26 is an outline perspective view of a vehicle control device according to a tenth embodiment with a casing removed therefrom. Arrangement of functional modules having different shapes is especially explained in more detail. In FIG. 26, each of the functional modules has the interface surface 22 separately including the first interface area 5 in which a group of signal line terminals is concentrated and the second interface area 6 in which a group of power line terminals is concentrated. The plural functional modules are divided into two groups, the interface surfaces of each of the groups are adjacently arranged to face in the same direction, and the interface surfaces of one of the groups and the interface surfaces of the other group are arranged face to face. On the respective interface surfaces, the first interface areas 5 are located on one end side (the lower end side in FIG. 26) in common and the second interface areas 6 are located on the other end side (the upper end side in FIG. 26) in common. The functional module 4E has the interface surface 22 only with the first interface area in which the group of signal line terminals is concentrated, and the first interface area is located on one end side (the lower end side in FIG. 26). By dividing the plural functional modules into two groups and arranging the interface surfaces of one of the group and the interface surfaces of the other group face to face, lengths of the power lines and the signal lines can be shortened.

In FIG. 26, the input terminal group 3 is located on the observers' left, and the terminal groups 9, 10a, 10b, and 251 are located on the observers' right, all of which are located on the upper side. The line-bundle housing unit 12 is located on the lower side. When the first interface areas 5 are located on the lower end side, there is no need to fix the signal lines by being hung and the signal lines can be easily housed in the wiring duct that is placed on the bottom surface of the casing and has the function to bundle the signal lines. Therefore, the method to bundle and fix the signal lines can be facilitated and the costs can be reduced. When the number of signal lines or signal line bundles is large, the assembly operation and the maintenance or inspection operation of the device become easier by looking from the underside of the vehicle.

Also when the functional modules of various sizes are arranged, the interface surfaces 22 are parallel to each other. FIG. 26 is a case in which, regarding the interface surfaces of one of the groups and the interface surfaces of the other group, the interface surfaces 22 of the plural functional modules 4 arranged laterally are in the same plane, and this case is a most appropriate example. However, even when the interface surfaces 22 of some of the functional modules 4 are out of alignment, the device does riot deviate from the embodiments of the present invention as log as the interface surfaces 22 are parallel to each other.

As described above, the most appropriate arrangement of the interface areas is obtained in the case where the first interface areas 5 of the functional modules are in the same plane and the second interface areas 6 of the functional modules are in the same plane. In this case, the signal lines and the power lines that connect the interface areas to each other can be arranged in the same planes, and therefore the wiring path can be most simplified. Because the wiring length is shortened and the processing of the power lines is simplified, inexpensive and lightweight power lines can be used.

As can be understood from FIG. 26, the basic movement line of the operator that mechanically mounts or electrically connects the functional modules 4 can be set in the lateral direction even in cases where the functional modules 4 have different shape. Therefore, difficulty in the operation itself can be lowered and the operation processes can be reduced. Furthermore, the operation to confirm that the operation has been reliably performed becomes easier. For example, the operator that mounts a bundle of signal lines, so-called harness, can perform the operation without frequently moving his/her eyes up and down. The electro-magnetic interference between the power lines and the signal lines can be effectively suppressed similarly. In this manner, the same effect can be obtained even when the functional modules 4 have different shapes.

As shown in FIG. 26, by arranging the interface surfaces 22 of the plural functional modules 4 in parallel to each other, the line-bundle housing unit 12 in the form of wiring duct, which is shared by the signal lines connected to the first interface areas 5 of the functional modules 4, can be provided. This prevents a mounting state of the signal line bundle, so-called harness, from being easily affected by operation variations, and always makes the operation stable. Therefore, the electro-magnetic separation between the signal lines and the power lines outside the functional modules 4 is ensured, and the tolerance for noise can be enhanced.

Figure 27:
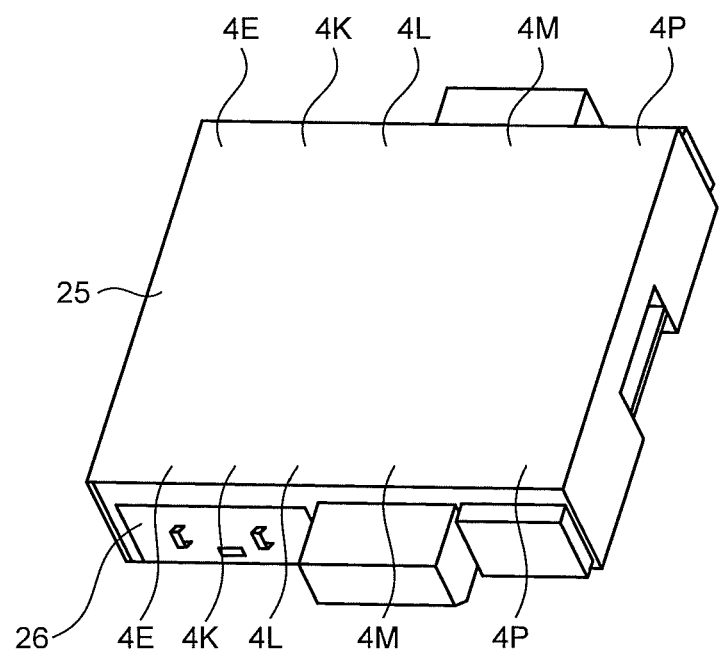
FIG. 27 is an outline perspective view of the vehicle control device covered with the casing according to the tenth embodiment.

FIG. 27 is an outline perspective view of a device that is obtained by arranging the functional modules 4 shown in FIG. 26 in the form of a box and covering the modules with the device casing 25 to be equipped to an actual vehicle. As shown in FIG. 27, when the inspection cover 26 is opened, the functional modules 4 that are to be inspected can be seen.

Eleventh Embodiment

Figure 28:
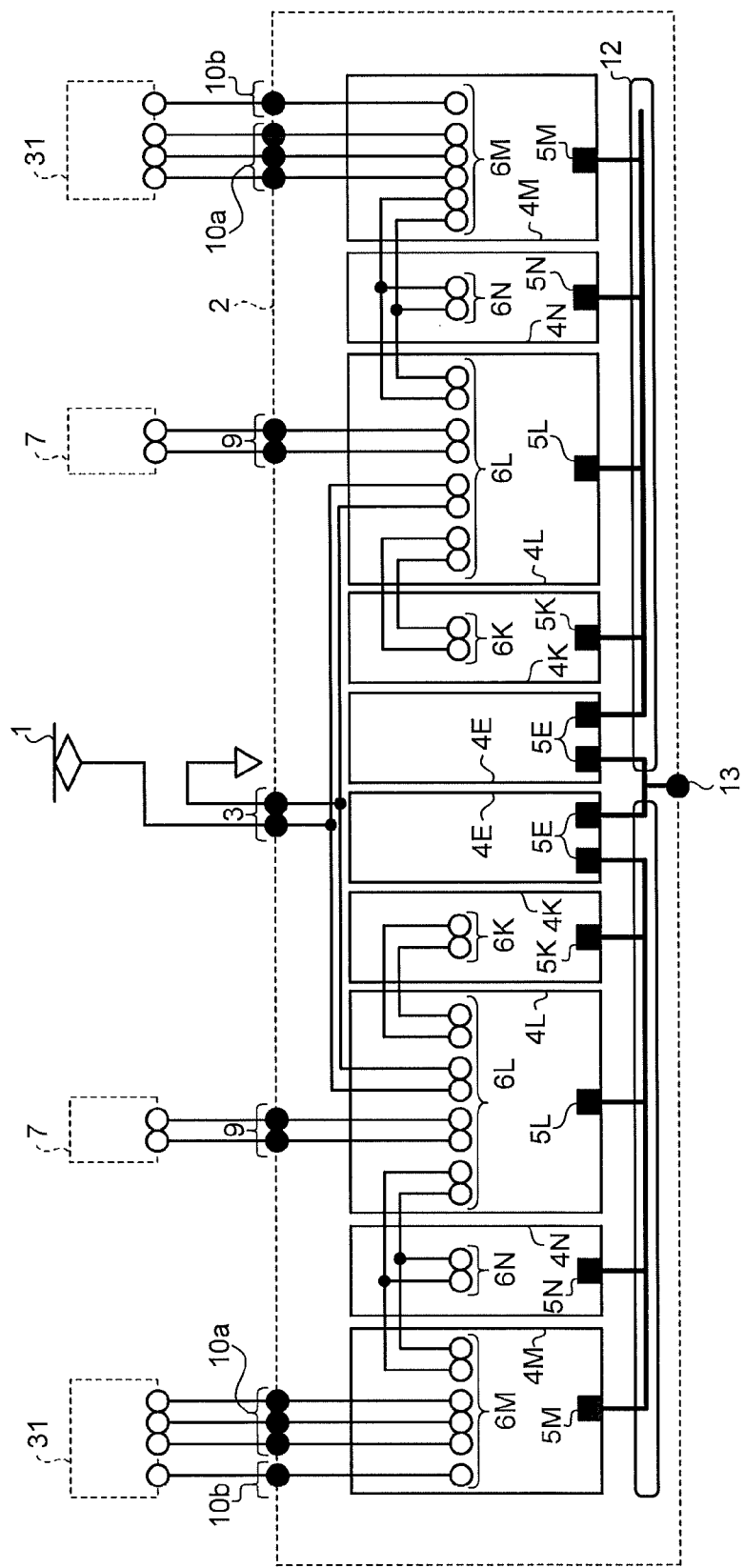
FIG. 28 is a block diagram of an example of a vehicle control device according to an eleventh embodiment of the present invention.

FIG. 28 is a block diagram of an example of a vehicle control device according to an eleventh embodiment. In FIG. 28, two same groups including plural functional modules are arranged horizontally abreast symmetrically about the center. Each of the functional modules 4 has one interface surface separately including the first interface area 5 in which a group of signal line terminals is concentrated on one end side and the second interface area 6 in which a group of power line terminals is concentrated on the other end side. The functional modules 4 of each group are adjacently arranged so that the interface surfaces face in the same direction, the first interface areas 5 are located on one end side (the lower end side in this example) in common, and the second interface areas 6 are located on the other end side (the upper end side in this example) in common. The functional module 4E has the first interface area 5E and no second interface area, like in FIG. 16, and the first interface area 5E of the functional module 4E is located on the side on which the first interface areas 5 of the other functional modules are located in common.

Accordingly, the basic movement line of the operator that mechanically mounts or electrically connects the functional modules 4 can be set to the lateral direction like in the sixth embodiment. Therefore, the difficulty in the operation itself can be reduced, and the operation processes can be also reduced. Furthermore, the operation for confirming that the operation has been reliably performed becomes easier. The electro-magnetic interference between the power lines and the signal lines can be effectively suppressed in the same way.

According to the sixth to tenth embodiments, a stable vehicle control device having high tolerance to noise can be obtained. The difficulty in the assembly operation can be lowered and the operation processes can be also reduced. It is possible to make these effects hard to depend on the casing structure of the device. In-vehicle devices need to maintain functions over a long period more than ten years, and maintenance and inspection operations required therefor can be effectively performed. Even when a part fails or maintenance parts are discontinued, only a relevant functional module can be re-designed and replaced, and accordingly a risk of interference with the vehicle operation can be suppressed.

Twelfth Embodiment

Figure 29:
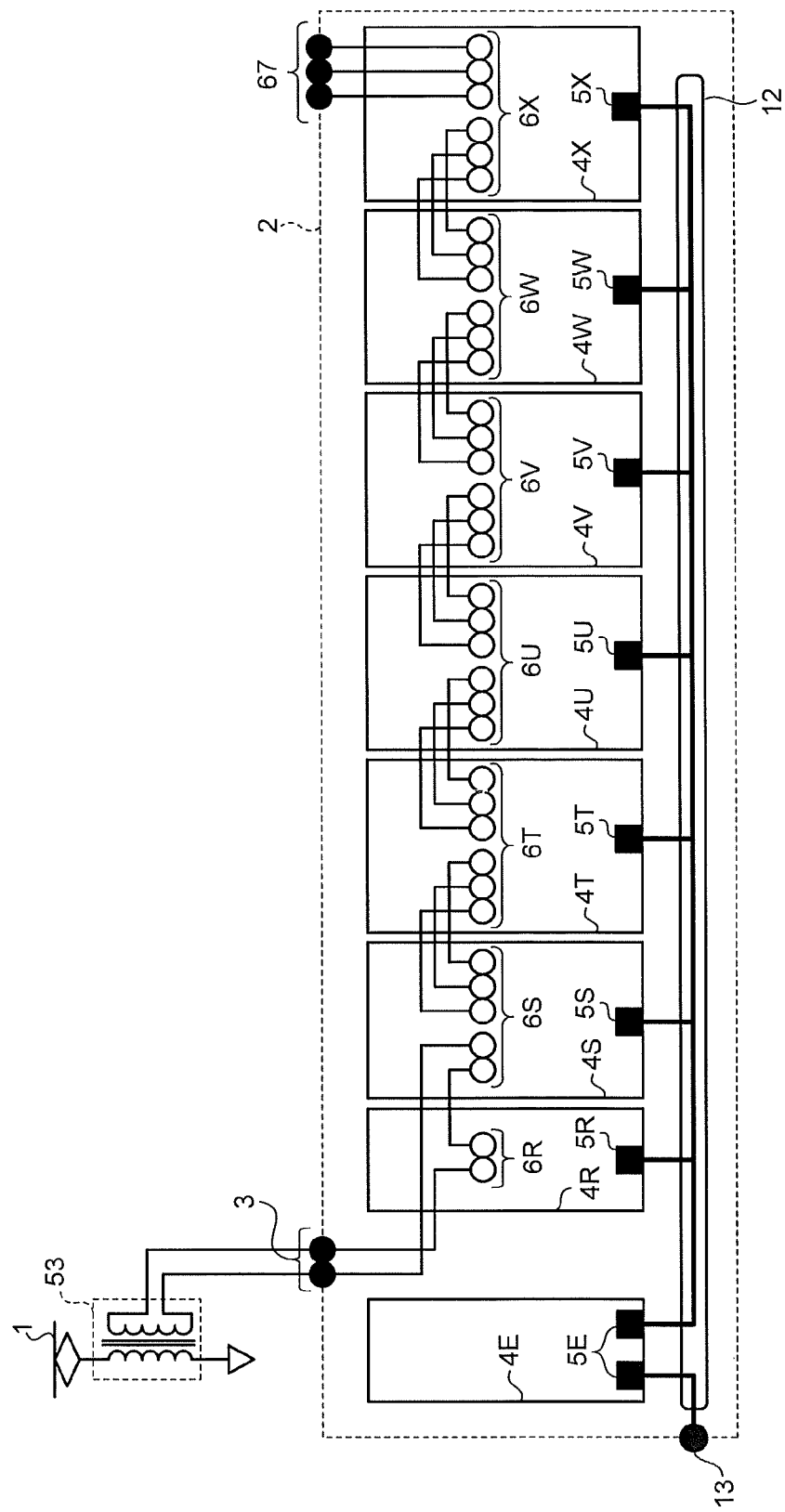
FIG. 29 is a block diagram of an example of a vehicle control device according to a twelfth embodiment.
Figure 30:
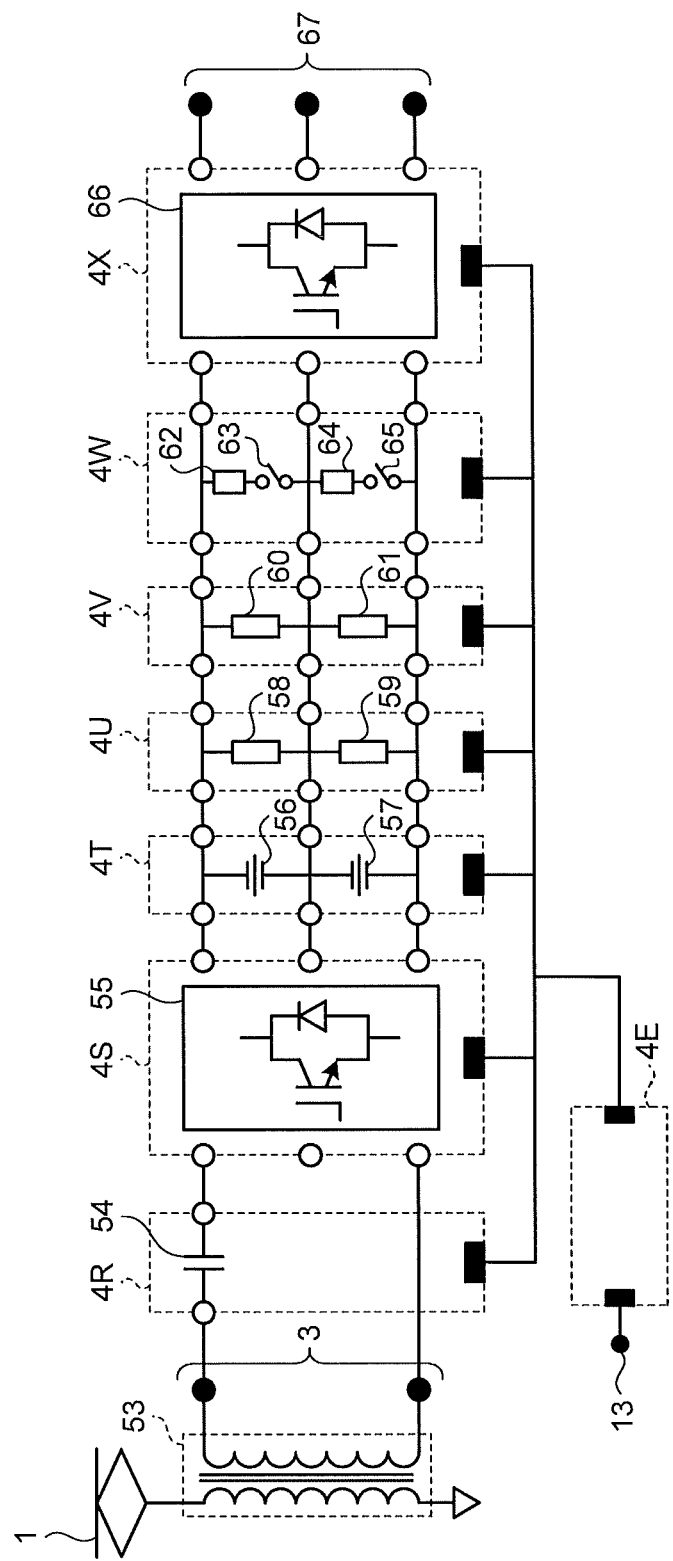
FIG. 30 is a circuit configuration diagram of the vehicle control device shown in FIG. 29.

A twelfth embodiment of the present invention is explained with reference to FIGS. 29 and 30. FIG. 29 is a block diagram of an example of a vehicle control device according to the present embodiment. FIG. 30 is a circuit configuration diagram of the vehicle control device shown in FIG. 29. FIGS. 29 and 30 depict a circuit configuration including a converter and an inverter targeted at a vehicle driving motor as a load.

As shown in FIG. 29, the vehicle-control device body 2 is connected to the overhead wire 1 (on the overhead wire side and on the ground side) through a transformer 53 and the input terminal group 3. That is, AC power supplied from the overhead wire 1 is inputted to the vehicle-control device body 2 from the input terminal group 3 via the transformer 53. The vehicle-control device body 2 includes functional modules 4R, 4S, 4X, and 4E, each of which is a minimum part unit that contributes to change in input/output potentials, and modules 4T, 4U, 4V, and 4W, each of which includes parts that do not contribute to change in input/output potentials. All the functional modules 4R, 4S, 4X, and 4E have first interface areas 5R, 5S, 5X, and 5D in which a group of signal line terminals is concentrated, respectively, and the functional modules 4R, 4S, and 4X except for the functional module 4E include second interface areas 6R, 6S, and 6X in which a group of power line terminals is concentrated, respectively. All the modules 4T, 4U, 4V, and 4W include first interface areas 5T, 5U, 5V, and 5W in which a group of signal line terminals is concentrated, and second interface areas 6T, 6U, 6V, and 6W in which a group of power line terminals is concentrated, respectively. The vehicle-control device body 2 has an output terminal group 67.

The line-bundle housing unit (wiring duct) 12 that houses a bundle of the signal lines is placed inside the vehicle-control device body 2. The vehicle-control device body 2 has the control input-terminal group 13 for transmitting or receiving information to or from a controller (not shown) that performs superior control of the vehicle control device.

FIG. 30 depicts an example of division of the functional modules 4R, 4S, 4X, and 4E and the modules 4T, 4U, 4V, and 4W according to functional definitions, and main parts as components are explained. The functional module 4R has a switch 54 and is an opening/closing circuit having a function to electrically connect to or disconnect from the overhead wire 1.

The functional module 4S has a switching circuit 55 and functions as a converter. The converter outputs AC power supplied from the overhead wire 1 through three output terminals, that is, a maximum potential terminal, an intermediate potential terminal, and a minimum potential terminal as DC power.

The module 4T includes capacitors 56 and 57 connected in series to each other and is connected in parallel to the switching circuit 55. The capacitor 56 is connected between the maximum potential terminal and the intermediate potential terminal of the converter, and the capacitor 57 is connected between the intermediate potential terminal and the minimum potential terminal of the converter.

The module 4U includes resistors 58 and 59 connected in series to each other and is connected in parallel to a circuit including the capacitors 56 and 57. The resistor 58 is connected between the maximum potential terminal and the intermediate potential terminal of the converter, and the resistor 59 is connected between the intermediate potential terminal and the minimum potential terminal of the converter.

The module 4V includes voltage sensors 60 and 61 connected in series to each other and is connected in parallel to a circuit including the resistors 58 and 59. The voltage sensor 60 is connected between the maximum potential terminal and the intermediate potential terminal of the converter, and the voltage sensor 61 is connected between the intermediate potential terminal and the minimum potential terminal of the converter.

The module 4W includes a resistor 62, a switch 63, a resistor 64, and a switch 65. The resistor 62, the switch 63, the resistor 64, and the switch 65 are connected in series to each other and are connected in parallel to a circuit including the voltage sensors 60 and 61. The resistor 62 and the switch 63 are connected between the maximum potential terminal and the intermediate potential terminal of the converter, and the resistors 64 and the switch 65 are connected between the intermediate potential terminal and the minimum potential terminal of the converter.

The functional module 4X has a switching circuit 66 and functions as an inverter. DC power outputted from the maximum potential terminal, the intermediate potential terminal, and the minimum potential terminal of the converter is inputted to the inverter through the modules 4T, 4U, 4V, and 4W. AC power outputted from the inverter is supplied to the load through the output terminal group 67.

The functional module 4E is a control circuit that has a control substrate and a relay circuit as the components and controls the entire vehicle control device according to a signal transmitted from the superior controller through the control input-terminal group 13.

Figure 31:
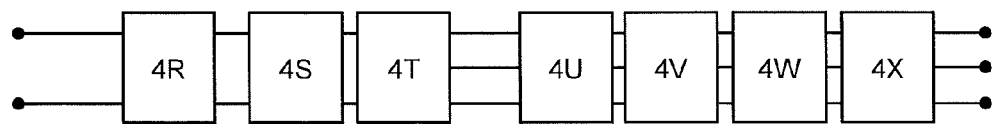
FIG. 31 is a block diagram of an arrangement relation between functional modules 4R, 4S, and 4X and modules 4T, 4U, 4V, and 4W shown in FIG. 30.

FIG. 31 is a block diagram of an arrangement relation between the functional modules 4R, 4S, and 4X and the modules 4T, 4U, 4V, and 4W shown in FIG. 30. Other components such as the functional module 4E are not shown.

As described in the first embodiment, parts that do not contribute to change in the input/output potentials can be provided as modules independently or included in the functional modules. That is, when the vehicle control device is to be configured, there is flexibility as a matter of design variation. Other combination examples of a converter and an inverter are explained below as modifications of the example shown in FIGS. 29 to 31.

Figure 32:
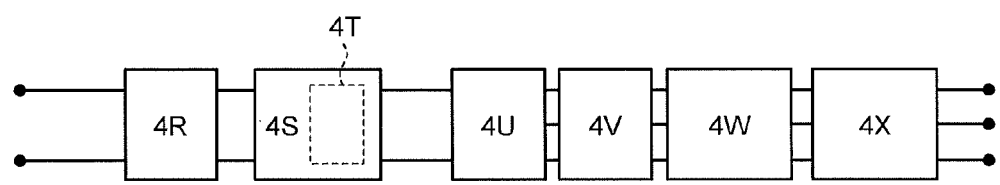
FIG. 32 is a block diagram of a combination example 1 of a converter and an inverter.
Figure 36:
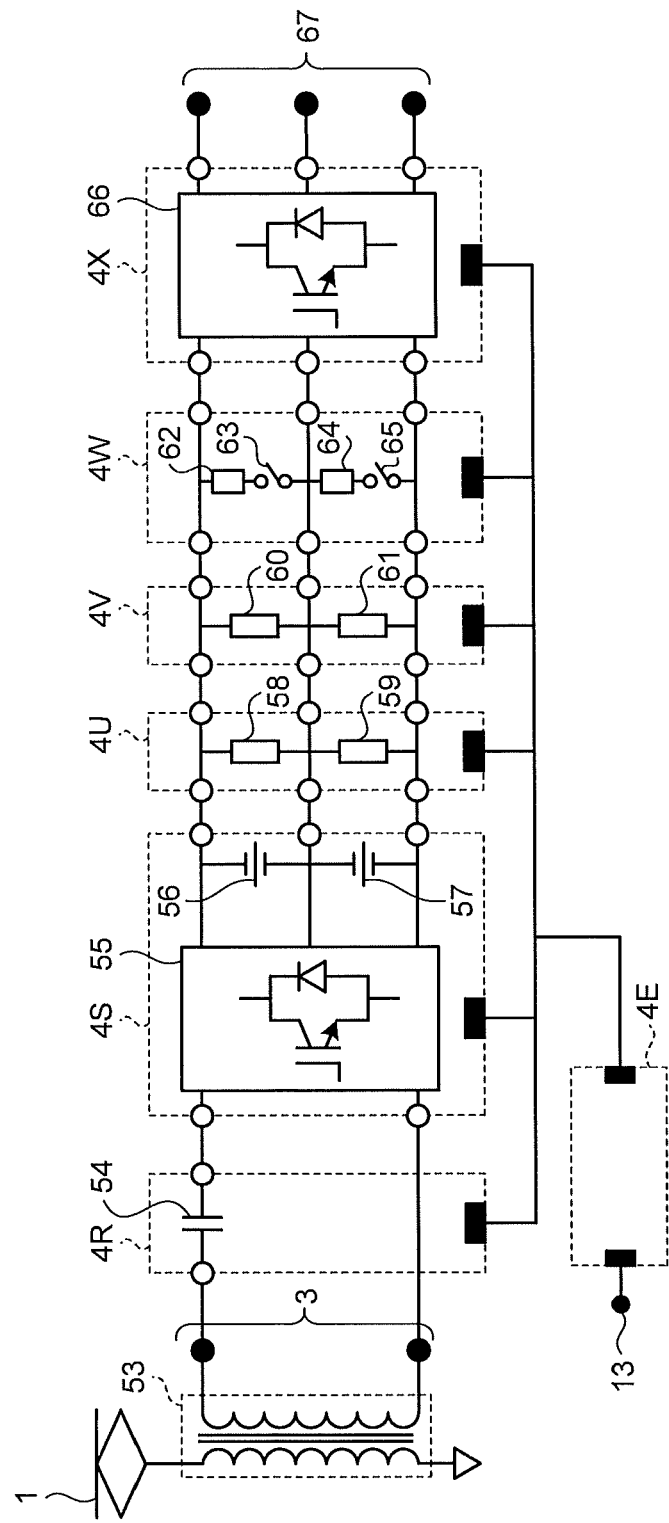
FIG. 36 is a circuit configuration diagram corresponding to FIG. 32.

FIG. 32 is a block diagram of a combination example 1 of a converter and an inverter. FIG. 36 is a circuit configuration diagram corresponding to FIG. 32. As shown in FIG. 36, while the circuit configuration is the same as that shown in FIG. 30, the module 4T shown in FIG. 30 is not included and the functional module 4S has a different configuration as that shown in FIG. 30 instead. That is, the functional module 4S includes the capacitors 56 and 57 that are parts included in the module 4T and not contributing to change in the input/output potentials. FIG. 32 schematically depicts the functional module 4S including the module 4T. Not limited to the combination example shown in FIG. 32, various combinations are possible. For example, the module 4T can be included in the module 4W or the functional module 4X, or can be included in all of the functional module 4S, the module 4W, and the functional module 4X.

Figure 33:
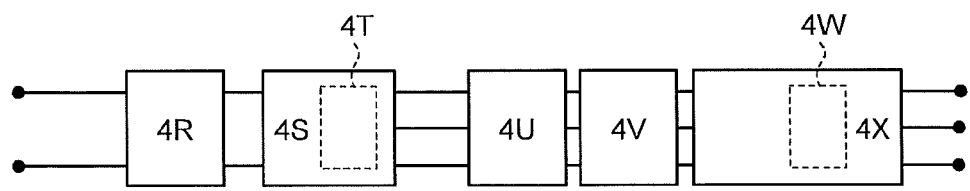
FIG. 33 is a block diagram of a combination example 2 of a converter and an inverter.
Figure 37:
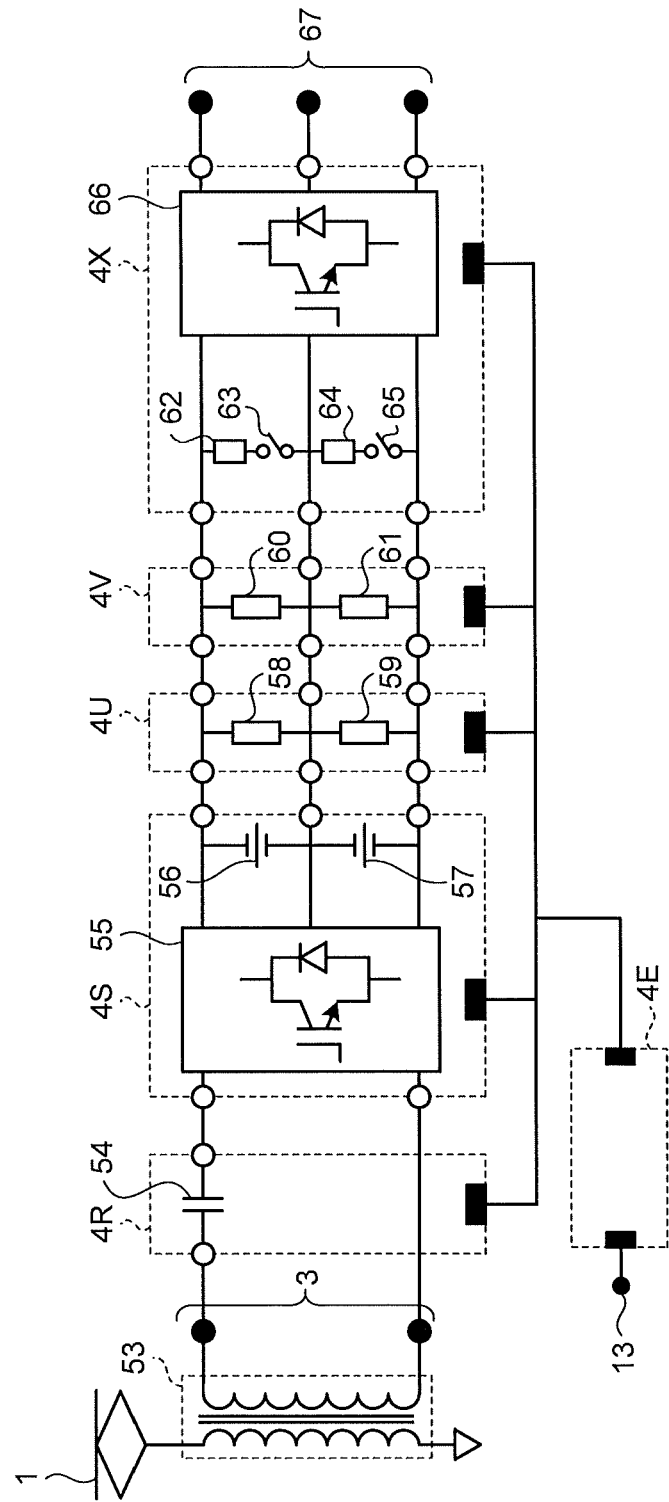
FIG. 37 is a circuit configuration diagram corresponding to FIG. 33.

FIG. 33 is a block diagram of a combination example 2 of a converter and an inverter, and FIG. 37 is a circuit configuration diagram corresponding to FIG. 33. As shown in FIG. 37, while the circuit configuration is the same as that shown in FIG. 30, the modules 4T and 4W in FIG. 30 are not included and the functional modules 4S and 4X have different configurations as those shown in FIG. 30 instead. That is, the functional module 4S includes the capacitors 56 and 57 that are parts included in the module 4T and not contributing to change in the input/output potentials, and the functional module 4X includes the resistor 62, the switch 63, the resistor 64, and the switch 65 that are parts included in the module 4W and not contributing to change in the input/output potentials. FIG. 33 schematically depicts the functional module 4S including the module 4T and the functional module 4X including the module 4W.

Figure 34:
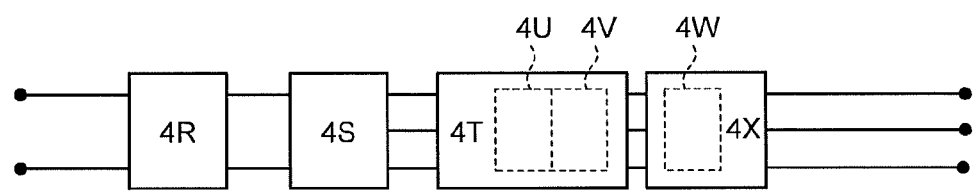
FIG. 34 is a block diagram of a combination example 3 of a converter and an inverter.
Figure 38:
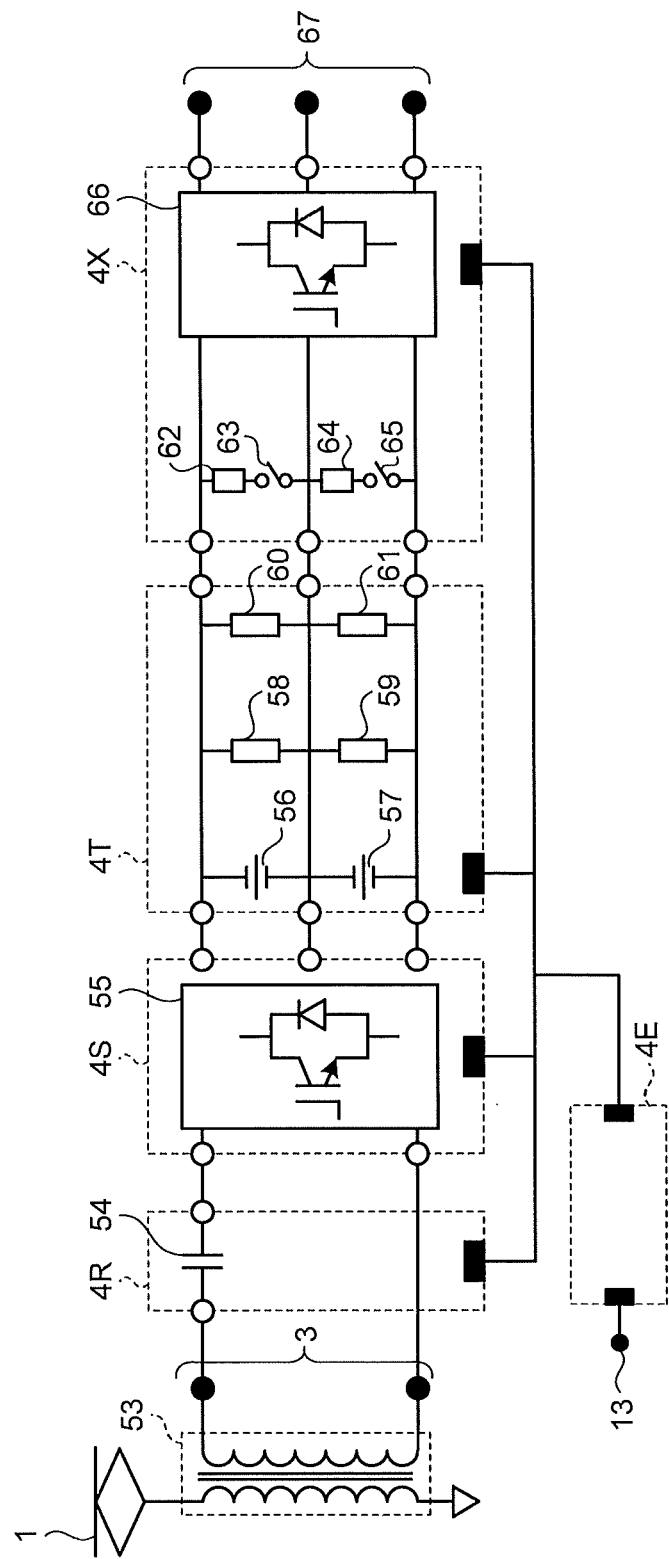
FIG. 38 is a circuit configuration diagram corresponding to FIG. 34.

FIG. 34 is a block diagram of a combination example 3 of a converter and an inverter, and FIG. 38 is a circuit configuration diagram corresponding to FIG. 34. As shown in FIG. 38, while the circuit configuration is the same as that shown in FIG. 30, the modules 4U, 4V, and 4W in FIG. 30 are not included and the module 4T and the functional module 4X have different configuration as those in FIG. 30 instead. That is, the module 4T includes the resistors 58 and 59 that are parts included in the module 4U and not contributing to change in the input/output potentials, and the voltage sensors 60 and 61 that are parts included in the module 4V and not contributing to change in the input/output potentials. The functional module 4X includes the resistor 62, the switch 63, the resistor 64, and the switch 65 that are the parts included in the module 4W and not contributing to change in the input/output potentials. FIG. 34 schematically depicts the module 4T including the modules 4U and 4V, and the functional module 4X including the module 4W.

Figure 35:
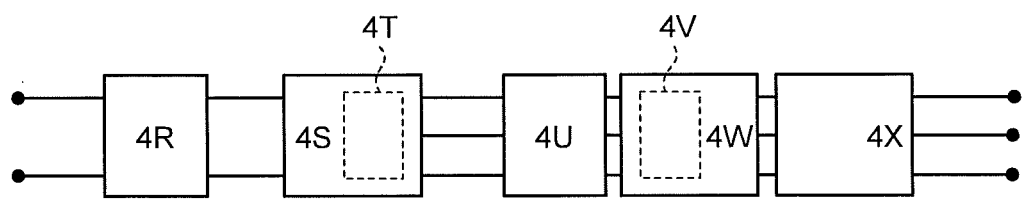
FIG. 35 is a block diagram of a combination example 4 of a converter and an inverter.
Figure 39:
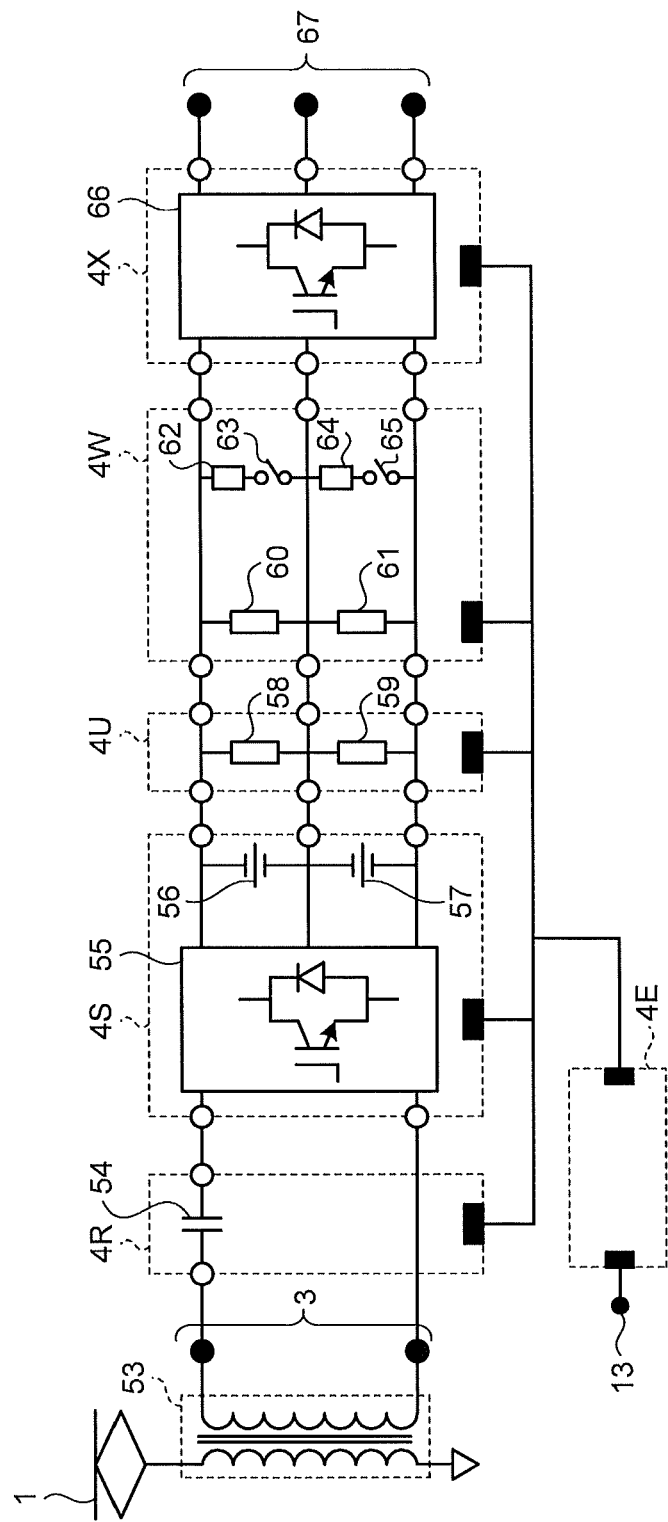
FIG. 39 is a circuit configuration diagram corresponding to FIG. 35.

FIG. 35 is a block diagram of a combination example 1 of a converter and an inverter, and FIG. 39 is a circuit configuration diagram corresponding to FIG. 35. As shown in FIG. 39, while the circuit configuration is the same as that shown in FIG. 30, the modules 4T and 4V in FIG. 30 are not included and the functional module 4S and the module 4W have different configuration from those in FIG. 30 instead. That is, the functional module 4S includes the capacitors 56 and 57 that are the parts included in the module 4T and not contributing to change in the input/output potentials, and the module 4W includes the voltage sensors 60 and 61 that are the parts included in the module 4V and not contributing to change in the input/output potentials. FIG. 35 schematically depicts the functional module 4S including the module 4T and the module 4W including the module 4V.

Also in the present embodiment, the functional modules and modules 4 each have the interface surface 22 (FIG. 7) having the first interface area 5 and the second interface area 6 in the same plane, like in the first embodiment. The group of signal line terminals is concentrated in the first interface area 5, and the group of power line terminals is concentrated in the second interface area 6. All the functional modules and the modules (except for the functional module 4E) applied to the first embodiment are designed based on the design rules previously standardized as shown in FIG. 7.

That is, like in the first embodiment, according to the design rules previously standardized, each of the functional modules and the modules having the signal line terminals and the power line terminals has an interface surface on one side separately including the first interface area 5 in which the signal line terminals are concentrated and the second interface area 6 in which the power line terminals are concentrated. On the interface surfaces, the first interface areas 5 are located on one end side in common and the second interface areas 6 are located on the other end side in common.

According to the present embodiment, the functional modules and the modules are adjacently arranged so that the interface surfaces face in the same direction, and the device includes the functional modules and the modules 4 each including the interface surface 22 according to the design rules previously standardized. Therefore, units of maintenance or inspection can be concentrated with respect to each function, and accordingly the maintenance or inspection operation can be streamlined. Furthermore, the electro-magnetic interference between the signal lines and the power lines can be effectively suppressed. Because the number of power lines can be reduced, the operation processes required for assembly, detachment, maintenance, or inspection can be reduced.

The functional module 4E is a different functional module having the interface surface with the first interface area 5E and no second interface area. The first interface area 5E of the interface surface of the different functional module 4E is located in common on the side on which the first interface areas 5 of the interface surfaces of the other functional modules 4R, 4S, and 4X and the modules 4T, 4U, 4V, and 4W are located. In this manner, the effect of measures for EMC can be stably obtained.

INDUSTRIAL APPLICABILITY

The present invention is useful for a vehicle control device that is equipped underneath a floor or on a roof of a vehicle in a box shape, for example, to supply power to devices and the like of the vehicle.

The invention claimed is:

1. A vehicle control device comprising:
a plurality of functional modules each of which has only one part that makes an output potential different from an input potential due to an operation thereof and, from the one part, a module providing an output potential equal to an input potential is not capable of being separated; and
signal lines and power lines connected to the plurality of functional modules, wherein
each of the functional modules has an interface surface on one side surface thereof, to which both of the signal line and the power line are connected,
each of the interface surfaces is divided into a first interface area in which a signal line terminal connected to the signal line is placed, and a second interface area in which a power line terminal connected to the power line is placed, and
the plurality of functional modules are adjacently arranged such that the interface surfaces face in a same direction, the first interface areas are located on one side in common, and the second interface areas are located on the other side in common.

2. The vehicle control device according to claim 1, wherein each of the interface surfaces of the functional modules is vertically divided into the first interface area and the second interface area.

3. The vehicle control device according to claim 1, wherein at least one functional module that has an interface surface including the first interface area and not including the second interface area is included, the first interface area of the interface surface of the functional module is located on the side on which the first interface areas of the interface surfaces of the other functional modules are located.

4. The vehicle control device according to claim 1, wherein at least one functional module that has an interface surface including the second interface area and not including the first interface area is included, the second interface area of the interface surface of the functional module is located on the side on which the second interface areas of the interface surfaces of the other functional modules are located.

5. The vehicle control device according to claim 1, wherein
the functional module having an opening/closing circuit that performs electrical connection to or disconnection from a DC overhead wire,
the functional module having a charging/discharging circuit that charges or discharges a DC voltage,
the functional module having an inverter that converts a DC voltage into an AC voltage,
a module consisting of parts not contributing to change in input/output potentials including a discharge switch, a discharge resistor, and a capacitor,
the functional module having a contactor that performs electrical connection to or disconnection from a load, and
the plurality of functional modules are connected in a stated order, and the vehicle control device is used as an auxiliary power-supply device.

6. The vehicle control device according to claim 1, wherein included are
the functional module having an opening/closing circuit that performs electrical connection or disconnection,
the functional module having a monitoring circuit that monitors a voltage and a current,
the functional module having an inverter that converts a DC voltage into an AC voltage, and
the functional module as the monitoring circuit connects an overhead wire to the other functional modules.

7. The vehicle control device according to claim 1, wherein included are
the functional module having an opening/closing circuit that performs electrical connection to or disconnection from an AC overhead wire,
the functional module having a converter that converts an AC voltage into a DC voltage, and
the functional module having an inverter that converts a DC voltage into an AC voltage.

8. A vehicle control device comprising:
a plurality of functional modules each of which has only one part that makes an output potential different from an input potential due to an operation thereof and, from the one part, a module providing an output potential equal to an input potential is not capable of being separated; and
signal lines and power lines connected to the plurality of functional modules, wherein
each of the functional modules has an interface surface on one side surface thereof, to which both of the signal line and the power line are connected,
each of the interface surfaces is divided into a first interface area in which a signal line terminal connected to the signal line is placed, and a second interface area in which a power line terminal connected to the power line is placed,
the plurality of functional modules are divided into two groups and arranged in two lines, the interface surfaces of each group are adjacently arranged to face in a same direction, and the interface surfaces of one of the groups and the interface surfaces of the other group are arranged face to face, and
the interface surfaces of one of the groups and the other group are arranged such that the first interface areas are located on one side in common and the second interface areas are located on the other side in common.

9. The vehicle control device according to claim 8, wherein each of the interface surfaces of the functional modules is vertically divided into the first interface area and the second interface area.

10. The vehicle control device according to claim 8, wherein at least one functional module that has an interface surface including the first interface area and not including the second interface area is included, the first interface area of the interface surface of the functional module is located on the side on which the first interface areas of the interface surfaces of the other functional modules are located.

11. The vehicle control device according to claim 8, wherein at least one functional module that has an interface surface including the second interface area and not including the first interface area is included, the second interface area of the interface surface of the functional module is located on the side on which the second interface areas of the interface surfaces of the other functional modules are located.

12. The vehicle control device according to claim 8, wherein included are
the functional module having an opening/closing circuit that performs electrical connection or disconnection,
the functional module having a monitoring circuit that monitors a voltage and a current,
the functional module having an inverter that converts a DC voltage into an AC voltage, and the functional module as the monitoring circuit connects an overhead wire to the other functional modules.

13. The vehicle control device according to claim 8, wherein included are the functional module having an opening/closing circuit that performs electrical connection to or disconnection from an AC overhead wire, the functional module having a converter that converts an AC voltage into a DC voltage, and the functional module having an inverter that converts a DC voltage into an AC voltage.

14. A vehicle control device comprising:

a plurality of functional modules each of which has only one part that makes an output potential different from an input potential due to an operation thereof and, from the one part, a module providing an output potential equal to an input potential is not capable of being separated; and signal lines and power lines connected to the plurality of functional modules, wherein each of the functional modules has an interface surface on one side surface thereof, to which both of the signal line and the power line are connected, each of the interface surfaces is divided into a first interface area in which a signal line terminal connected to the signal line is placed, and a second interface area in which a power line terminal connected to the power line is placed, the plurality of functional modules are divided into two groups and arranged in two lines, the interface surfaces of each group are adjacently arranged to face in a same direction, and the interface surfaces of one of the groups and the interface surfaces of the other group are arranged to face in a same direction, and ones of the interface areas of the interface surfaces of one of the groups and the other group are located on a side between the lines, and the other interface areas are located on a side opposite to the side between the lines.

15. The vehicle control device according to claim 14, wherein the plurality of functional modules are arranged such that the first interface areas of the interface surfaces of one of the groups and the other group are located on the side between the lines and the second interface areas are located on the side opposite to the side between the lines.

16. The vehicle control device according to claim 14, wherein each of the interface surfaces of the functional modules is vertically divided into the first interface area and the second interface area.

17. The vehicle control device according to claim 14, wherein at least one functional module that has an interface surface including the first interface area and not including the second interface area is included, the first interface area of the interface surface of the functional module is located on the side on which the first interface areas of the interface surfaces of the other functional modules are located.

18. The vehicle control device according to claim 14, wherein at least one functional module that has an interface surface including the second interface area and not including the first interface area is included, the second interface area of the interface surface of the functional module is located on the side on which the second interface areas of the interface surfaces of the other functional modules are located.

19. The vehicle control device according to claim 14, wherein included are the functional module having an opening/closing circuit that performs electrical connection or disconnection, the functional module having a monitoring circuit that monitors a voltage and a current, the functional module having an inverter that converts a DC voltage into an AC voltage, and the functional module as the monitoring circuit connects an overhead wire to the other functional modules.

20. The vehicle control device according to claim 14, wherein included are the functional module having an opening/closing circuit that performs electrical connection to or disconnection from an AC overhead wire, the functional module having a converter that converts an AC voltage into a DC voltage, and the functional module having an inverter that converts a DC voltage into an AC voltage.

\* \* \* \* \*